(12) United States Patent
Stefanini

(10) Patent No.: US 11,399,074 B2
(45) Date of Patent: Jul. 26, 2022

(54) DEVICES, SYSTEMS, AND METHODS FOR MODIFYING FEATURES OF APPLICATIONS BASED ON PREDICTED INTENTIONS OF USERS

(71) Applicant: Facebook Technologies, LLC, Menlo Park, CA (US)

(72) Inventor: Fabio Stefanini, New York, NY (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/123,692

(22) Filed: Dec. 16, 2020

(65) Prior Publication Data

US 2022/0191296 A1 Jun. 16, 2022

(51) Int. Cl.
*G06F 3/0484* (2022.01)
*H04L 67/50* (2022.01)
*G06F 3/01* (2006.01)

(52) U.S. Cl.
CPC ............. *H04L 67/22* (2013.01); *G06F 3/015* (2013.01); *G06F 3/0484* (2013.01)

(58) Field of Classification Search
CPC ................................. G06F 3/015; G06F 3/0484
See application file for complete search history.

(56) References Cited

U.S. PATENT DOCUMENTS

| | | | | |
|---|---|---|---|---|
| 2017/0003762 | A1* | 1/2017 | Ishii | G06F 3/0383 |
| 2017/0052674 | A1* | 2/2017 | Tokutake | G06F 3/017 |
| 2018/0132776 | A1* | 5/2018 | Flickinger | A63F 13/25 |
| 2019/0156434 | A1* | 5/2019 | Lin | G06Q 50/01 |
| 2019/0244429 | A1* | 8/2019 | Flaherty-Woods | G06F 3/013 |
| 2019/0354136 | A1* | 11/2019 | Fu | G06F 1/163 |
| 2020/0073936 | A1* | 3/2020 | Jankowski | G06N 3/08 |
| 2020/0107766 | A1* | 4/2020 | Liu | A61B 5/377 |
| 2020/0151439 | A1* | 5/2020 | Johnson | G06K 9/00315 |
| 2020/0298128 | A1* | 9/2020 | Yannakakis | A63F 13/67 |
| 2020/0405213 | A1* | 12/2020 | Chappell, III | A61B 5/16 |
| 2021/0011614 | A1* | 1/2021 | Gustman | G06F 3/16 |

* cited by examiner

*Primary Examiner* — David E Choi
(74) *Attorney, Agent, or Firm* — FisherBroyles, LLP

(57) ABSTRACT

A disclosed system may include (1) a wearable dimensioned to be donned on a body of a user of a computing device (2) a set of sensors coupled to the wearable, wherein the set of sensors detect one or more neuromuscular signals via the body of the user, and (3) at least one processing device communicatively coupled to the set of sensors, wherein the processing device (A) determines, based at least in part on the neuromuscular signals detected by the set of sensors, an intention of the user in connection with an application running on the computing device and, in response to determining the intention of the user, (B) modifying a feature of the application running on the computing device to account for the intention of the user. Various other devices, systems, and methods are also disclosed.

19 Claims, 18 Drawing Sheets

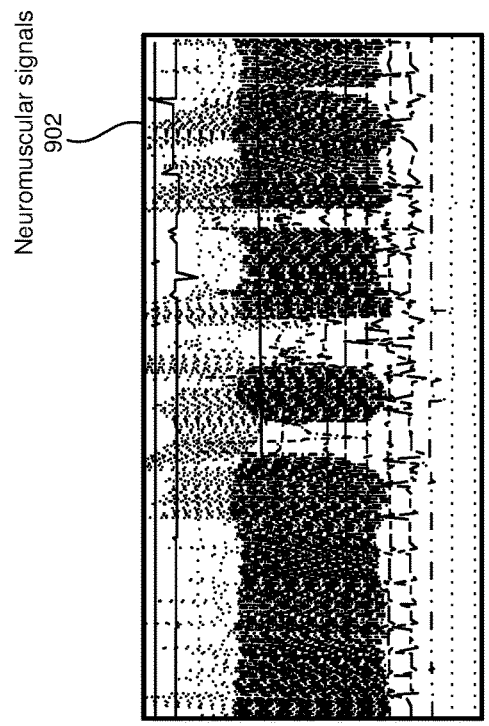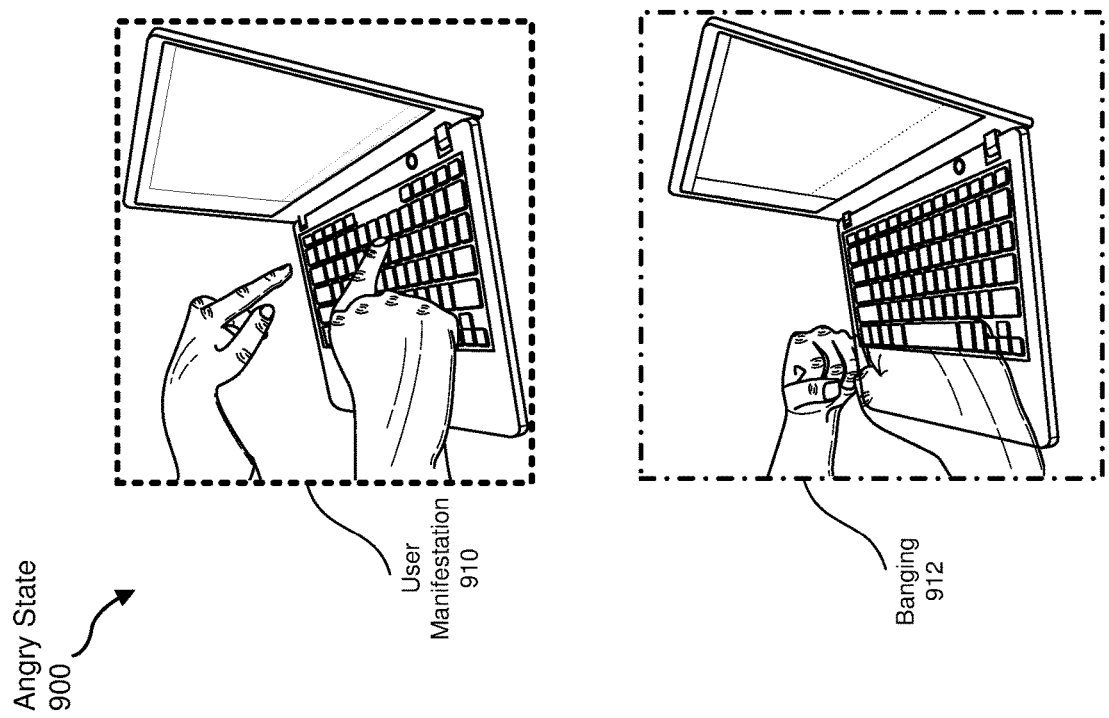
FIG. 9

DEVICES, SYSTEMS, AND METHODS FOR MODIFYING FEATURES OF APPLICATIONS BASED ON PREDICTED INTENTIONS OF USERS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 9 is an illustration of an additional exemplary angry state experienced by a user operating an application.

Figure 1:
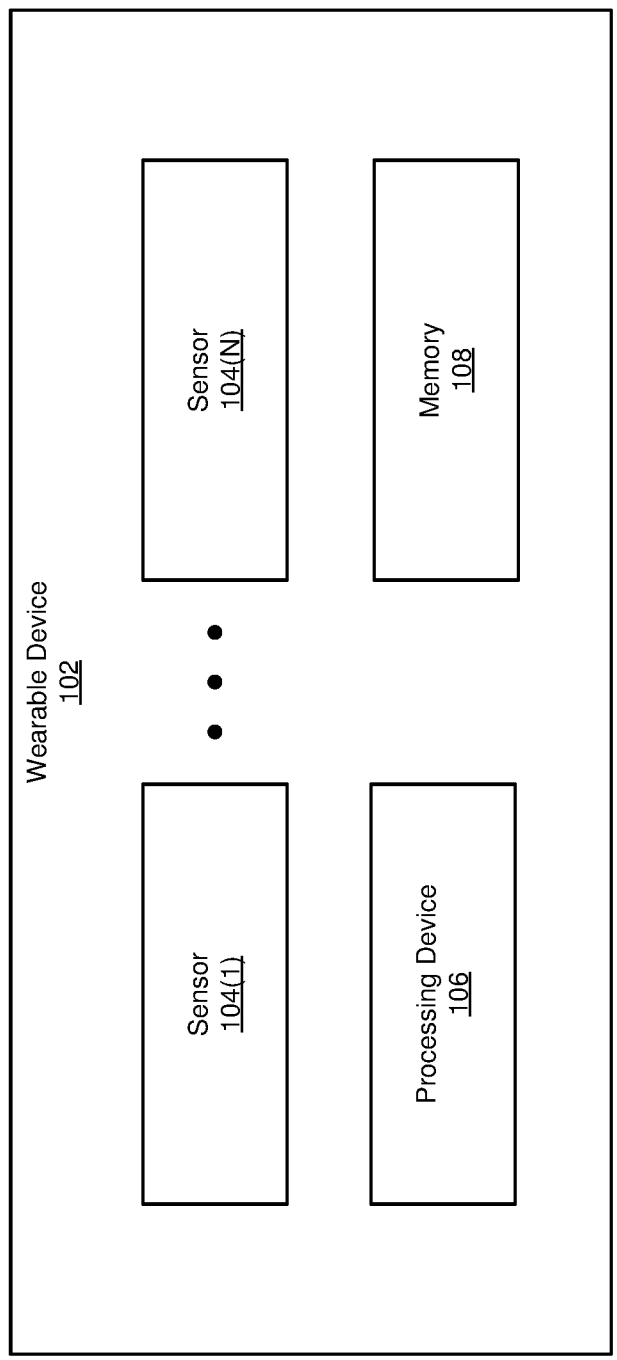
FIG. 1 is a block diagram of an exemplary wearable device that facilitates modifying features of applications based on predicted intentions of users.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to devices, systems, and methods for modifying features of applications based on predicted intentions of users. As will be explained in greater detail below, these devices, systems, and methods may provide numerous features and benefits.

Human machine interfaces (HMIs) often encompass and/or refer to the means and/or mechanisms with which humans communicate with, instruct, and/or control computers. Examples of such HMIs include, without limitation, mice, keyboards, touchscreens, touchpads, joysticks, styluses, buttons, handheld controllers, combinations or variations of one or more of the same, and/or any other suitable HMIs.

Some interactions between humans and machines (such as computers) may necessitate and/or call for the use and/or application of multiple HMIs simultaneously. In some examples, a user may switch back and forth between different HMIs to engage with interactive media presented and/or displayed on a computer. For example, a user may switch between using a mouse and using a keyboard multiple times during a single interactive media session. As computing devices become more portable, the development of HMIs may become more complex due at least in part to design tradeoffs resulting from size constraints and/or mobility requirements of portable devices.

Unfortunately, as the portability of computing devices becomes even more ubiquitous, traditional HMIs may become less desirable and/or convenient for users. Moreover, traditional HMIs may be unable to determine and/or communicate the intentions of users except when such intentions are explicitly entered and/or conveyed by the users. The instant disclosure, therefore, identifies and addresses a need for additional devices, systems, and methods for modifying features of applications based on sensed and/or predicted intentions of users.

As will be described in greater detail below, the various devices, systems, and methods described herein may involve the use of a wearable device capable of detecting and/or sensing neuromuscular signals traversing through a user's body. For example, a user may wear a smart wristband with multiple surface electromyography (EMG) sensors that detect and/or sense neuromuscular signals traversing the user's arm, wrist, and/or hand. In this example, the smart wristband may be communicatively coupled to a nearby computing device. In response to certain neuromuscular signals detected via the user's body, the smart wristband may direct the computing device to perform one or more actions that account for those neuromuscular signals.

As a more specific example, the user may wear the smart wristband while interacting with an application running on the computing device. In this example, as the user interacts with that application, the smart wristband may detect and/or sense neuromuscular signals indicative of the user's intentions with respect to that application and/or neuromuscular signals indicative of the user's emotional state while interacting with that application. In response, the smart wristband may direct the computing device to modify one or more features of the application to account for and/or reflect the user's intentions and/or emotional state.

Accordingly, the smart wristband may enable the user to engage with interactive media presented and/or displayed on the computing device in less restrictive ways than traditional HMIs. The smart wristband may be used to control certain elements of interactive media based at least in part on EMG signals that correlate and/or correspond to user intentions and/or emotional states. The smart wristband may enable the user to direct the computing device to modify certain features of applications running on the computing device based at least in part on such user intentions and/or emotional states. Examples of such modifications include, without limitation, emboldening text entered into applications, italicizing text entered into applications, underlining text entered into applications, changing the font or size of text entered into applications, adding emojis or animated stickers to outgoing communications created in applications, altering audio or visual features of applications, variations or combinations of one or more of the same, and/or any other suitable interactive tasks.

In some implementations, a wearable device may be used to transition between different mappings of user intentions to responsive actions. For example, the wearable device may detect and/or sense certain neuromuscular signals traversing a user's body. In this example, those neuromuscular signals may correspond to and/or represent a specific intention and/or emotional state of the user. One mapping may cause the wearable device and/or the target computing device to perform a certain action and/or modification of action in response to the detection of a specific intention and/or emotional state of the user. However, another mapping may cause the wearable device and/or the target computing device to perform a different action and/or modification in response to the detection of the same intention and/or emotional state of the user. In one embodiment, the wearable device may enable the user to transition between those mappings via neuromuscular signals.

In some examples, the terms "wearable" and "wearable device" may refer to any type or form of computing device that is worn by a user of a computing device as part of an article of clothing, an accessory, and/or an implant. In one example, a wearable device may include and/or represent a wristband secured to and/or worn by the wrist of a user. Additional examples of wearable devices include, without limitation, armbands, pendants, bracelets, rings, jewelry, anklebands, clothing, electronic textiles, shoes, clips, headsets, headbands, head-mounted displays, gloves, glasses, neckbands, variations or combinations of one or more of the same, and/or any other suitable wearable devices.

The following will provide, with reference to FIGS. 1-4 and 8-18 detailed descriptions of exemplary devices, systems, components, and corresponding implementations for modifying features of applications based on predicted intentions of users. Detailed descriptions of an exemplary application whose features are modified based on the predicted intentions of users will be provided in connection with FIGS. 5 and 6. In addition, detailed descriptions of computer-implemented methods for modifying features of applications based on predicted intentions of users will be provided in connection with FIG. 7.

FIG. 1 illustrates an exemplary wearable device 102 capable of sensing and/or detecting the intentions of users via neuromuscular signals. As illustrated in FIG. 1, exemplary wearable device 102 may include and/or represent a set of sensors 104(1)-(N). In some examples, at least a portion of set of sensors 104(1)-(N) may detect and/or sense neuromuscular signals traversing the body of a user. In one example, exemplary wearable device 102 may also include and/or represent a processing device 106 communicatively coupled to sensors 104(1)-(N) and/or memory 108. In this example, memory 108 may include and/or store one or more software modules and/or trained inferential models that, when executed by processing device 106, cause processing device 106 to determine and/or predict the intentions and/or emotional states of users based at least in part on the neuromuscular signals detected by the sensors 104(1)-(N). Additionally or alternatively, memory 108 may include and/or store one or more software modules and/or trained inferential models that, when executed by processing device 106, cause processing device 106 to modify application features to account for the intentions and/or emotional states of the users.

In some examples, processing device 106 may generate one or more messages and/or input commands for a separate computing device (not necessarily illustrated in FIG. 1). In one example, such messages and/or input commands may indicate and/or identify the intentions and/or emotional states of the users to the separate computing device. In another example, such messages and/or input commands may be used by the separate computing device to determine, predict, and/or infer the intentions and/or emotional states of the users. Additionally or alternatively, such messages and/or or input commands may direct the separate computing device to execute one or more computer-readable instructions that cause applications to modify certain features to account for the intentions and/or emotional states of the users.

In some examples, sensors 104(1)-(N) may each constitute and/or represent any type or form of sensor capable of detecting and/or sensing neuromuscular signals via a user's body. In one example, sensors 104(1)-(N) may include and/or represent one or more neuromuscular sensors and/or EMG sensors arranged circumferentially around wearable device 102. Additional examples of sensors 104(1)-(N) include, without limitation, mechanomyography (MMG) sensors, sonomyography (SMG) sensors, combinations or variations of one or more of the same, and/or any other suitable sensors. Any suitable number and/or arrangement of sensors 104(1)-(N) may be applied to wearable device 102.

In some embodiments, sensors 104(1)-(N) may include one or more EMG sensors, MMG sensors, and/or SMG sensors as well as one or more auxiliary sensors that record auxiliary signals and/or information. Examples of such auxiliary sensors include, without limitation, inertial measurement unit (IMU) sensors, accelerometers, gyroscopes, magnetometers, position-tracking sensors, microphones, imaging sensors (e.g., cameras), radiation-based sensors for use with radiation-generation devices (e.g., laser-scanning devices), heart-rate monitors, oximeters, combinations or variations of one or more of the same, and/or any other suitable auxiliary sensors.

In some examples, sensors 104(1)-(N) may be communicatively coupled to one another and/or to processing device 106 by flexible electronics, connectors, and/or wiring. Additionally or alternatively, sensors 104(1)-(N) may be integrated with and/or into an elastic band of wearable device 102.

In some embodiments, the output of one or more of sensors 104(1)-(N) may be processed, amplified, rectified, and/or filtered via hardware signal processing circuitry. Additionally or alternatively, the output of one or more of sensors 104(1)-(N) may be processed, amplified, rectified, and/or filtered via signal processing software or firmware.

Accordingly, the processing of neuromuscular signals may be performed in hardware, software, and/or firmware.

As illustrated in FIG. 1, exemplary wearable device 102 may also include one or more processors, such as processing device 106. In some examples, processing device 106 may include and/or represent any type or form of hardware-implemented processing device capable of interpreting and/or executing computer-readable instructions. In one example, processing device 106 may access and/or modify certain software modules and/or inferential models to facilitate modifying features of applications based at least in part on neuromuscular signals detected via the bodies of users. Examples of processing device 106 include, without limitation, physical processors, central processing units (CPUs), microprocessors, microcontrollers, field-programmable gate arrays (FPGAs) that implement softcore processors, application-specific integrated circuits (ASICs), neuromorphic devices, neurocomputing devices, neural processors, brain chips, neurosynaptics cores, portions of one or more of the same, variations or combinations of one or more of the same, and/or any other suitable processing device.

As illustrated in FIG. 1, exemplary wearable device 102 may further include one or more memory devices, such as memory 108. Memory 108 generally represents any type or form of volatile or non-volatile storage device or medium capable of storing data, computer-readable instructions, and/or parameters of connectivity that facilitate implementation of a specific input-output relationship. In one example, memory 108 may store, load, and/or maintain one or more software modules and/or trained inferential models that perform certain tasks, classifications, and/or determinations based at least in part on neuromuscular signals. Examples of memory 108 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory. Although illustrated as separate devices in FIG. 1, processing device 106 and memory 108 may, in some embodiments, be considered and/or viewed as a single device and/or unit (e.g., a neuromorphic device, neurocomputing device, neural processor, brain chip, and/or neurosynaptics core) that combines memory and processing on the same real estate.

In some examples, wearable device 102 may include and/or represent a wearable band. For example, wearable device 102 may include and/or represent a strap and/or band designed and/or dimensioned to at least partially encompass the user's wrist and/or arm. The strap and/or band may include and/or contain a variety of different materials. Examples of such materials include, without limitation, cottons, polyesters, nylons, elastics, plastics, neoprene, rubbers, metals, woods, composites, combinations or variations of one or more of the same, and/or any other suitable materials. The strap and/or band may be defined and/or formed in a variety of shapes and/or sizes with the aim of securing wearable device 102 to the user's wrist and/or arm. In one example, the strap and/or band may include and/or represent one or more segments, links, and/or sections. Additionally or alternatively, the strap and/or band may be adjustable to provide a one-size-fits-most feature.

In some embodiments, wearable device 102 may include and/or incorporate one or more additional components that are not represented and/or illustrated in FIG. 1. For example, although not necessarily illustrated and/or labeled in this way in FIG. 1, wearable device 102 may also include and/or incorporate circuitry, transistors, resistors, capacitors, diodes, transceivers, sockets, wiring, and/or circuit boards, among other components.

In some examples, when wearable device 102 is worn by the user, sensors 104(1)-(N) may interface and/or make physical contact with the user's skin. In one example, wearable device 102 may be communicatively coupled to a computing system (such as a mobile phone, virtual reality headset, an augmented reality headset, a laptop, a desktop, a smart television, a monitor, etc.). In this example, the user may experience and/or develop a certain intention while operating an application running on the computing system. As the user experiences and/or develops this intention, the user's body may generate and/or produce neuromuscular signals representative, indicative, and/or suggestive of that intention. In one embodiment, the intention experienced by the user may represent, indicate, and/or suggest his or her emotional state with respect to the application.

Accordingly, the user's intentions and/or emotional state may convey meaningful and/or useful information to the application running on the computing system. For example, wearable device 102 may be able to determine, discern, and/or predict the user's intentions and/or emotional state based on neuromuscular signals detected via the user's body. In response, wearable device 102 may modify and/or alter one or more features of the application running on the computing system to account for the user's intentions and/or emotional state.

In some example, the neuromuscular signals may traverse and/or travel through the user's body. For example, the user may experience one or more emotions (such as anger, stress, fear, calm, neutral states, relaxation, joy, happiness, and/or elation) that cause the user's body to generate neuromuscular signals that traverse down his or her arm toward the hand. In one example, one or more of sensors 104(1)-(N) may detect and/or sense the neuromuscular signals as they traverse down the arm toward the hand. In response to detecting and/or sensing those signals, one or more of sensors 104(1)-(N) may generate and/or produce data representative of those signals.

In some examples, those sensors may provide and/or deliver a version of the data representative of the detected neuromuscular signals to at least one processing device (e.g., processing device 106, a processor incorporated in the computing system to which wearable device 102 is communicatively coupled, and/or a processor incorporated in an intermediary communication link or dongle). This data may undergo certain processing and/or conversions prior to being provided and/or delivered to the processing device. Accordingly, the version of data provided and/or delivered to the processing device may be any derivation and/or processed representation of the output received from the sensors. Examples of this version of the data include, without limitation, raw data produced and/or output by the sensors, digital conversions and/or representations of analog signals output by the sensors, processed digital representations of signals output by the sensors, combinations or variations of one or more of the same, and/or any other suitable version of data representative of neuromuscular signals.

In this example, the processing device may analyze and/or evaluate the data representative of the neuromuscular signals to determine the user's intentions and/or emotional state with respect to the application running on the computing system. For example, the processing device may implement a trained inferential model. The processing device may input and/or feed the data representative of the neuromuscular signals to the inferential model. From that data, the trained inferential model may then output and/or produce a classification that identifies and/or indicates the user's intentions and/or emotional state. Accordingly, the processing device may determine, predict, and/or discern the user's intentions and/or emotional state based at least in part on the output of the inferential model.

In some examples, the processing device may be able to determine the amount of force produced and/or exerted by one or more body parts of the user based at least in part on sensors 104(1)-(N). For example, from the data representative of the detected neuromuscular signals, the trained inferential model may output and/or produce an indication or measurement that identifies and/or specifies the amount of force exerted by those body parts. In response to determining the amount of force produced by those body parts, the processing device may generate one or more input commands for the computing system. Such input commands may account for the user's intentions and/or emotional state as well as the amount of force produced and/or exerted by those body parts.

In some examples, the processing device may cause the computing system to which wearable device 102 is communicatively coupled to perform one or more actions and/or modifications mapped to such intentions, emotional state, and/or the amount of force exerted by those body parts. For example, the processing device may direct the computing system to perform those actions and/or modifications by sending and/or providing those input commands to the computing system. In one example, the processing device may determine and/or identify one or more characteristics of those actions and/or modifications to be regulated in accordance with the amount of force produced by the user's body parts. In this example, the processing device may formulate the input command to account for the amount of force produced by the user's body parts such that the characteristics of those actions and/or modifications correspond to the amount of force produced by the user's body parts.

Various actions and/or modifications may be mapped to different intentions and/or emotional states of the user. Similarly, various actions and/or modifications may be mapped to and/or be commensurate with different degrees of force in conjunction with different intentions and/or emotional states of the user.

As another example, as the amount of force produced by the user's body parts increases, so too may the intensity level of the user's intentions and/or emotional state. Conversely, as the amount of force produced by the user's body parts decreases, so too may the intensity level of the user's intentions and/or emotional state.

Various forms of feedback may be provided to the user as the computing system performs the actions and/or modifications mapped to the user's intentions and/or emotional state. For example, one feedback indication may include and/or represent a prompt and/or dialog presented to the user via a display on the computing system. In this example, the prompt and/or dialog may request feedback and/or input from the user to confirm whether the predicted and/or discerned intention or emotional state of the user is accurate. Additionally or alternatively, the prompt and/or dialog may request feedback and/or input from the user to confirm whether the user wants the application to apply and/or perform the action and/or modification mapped to such an intention and/or emotional state.

In some examples, the processing device and/or the computing system may maintain one or more mappings between possible user intentions or emotional states and responsive actions or modifications capable of being performed by the computing system. For example, the processing device and/or the computing system may maintain a first mapping between possible intentions or emotional states and a first set of actions and/or modifications. In this example, the processing device and/or the computing system may also maintain a second mapping between possible intentions or emotional states and a first set of actions and/or modifications. The processing device and/or the computing system may activate the first mapping and/or deactivate the second mapping such that one or more of the actions and/or modifications in the first set are performed in response to one or more detected user intentions and/or emotional states. In some embodiments, the user may be able to switch between the mappings, alter existing mappings, and/or create new mappings.

In some examples, the processing device and/or computing system may map any number of intentions and/or emotional states to a single action and/or modification. In these examples, to initiate performance of the action and/or modification, the processing device and/or computing system may ensure and/or determine that at least one of those intentions and/or emotional states has been satisfied.

Figure 2:
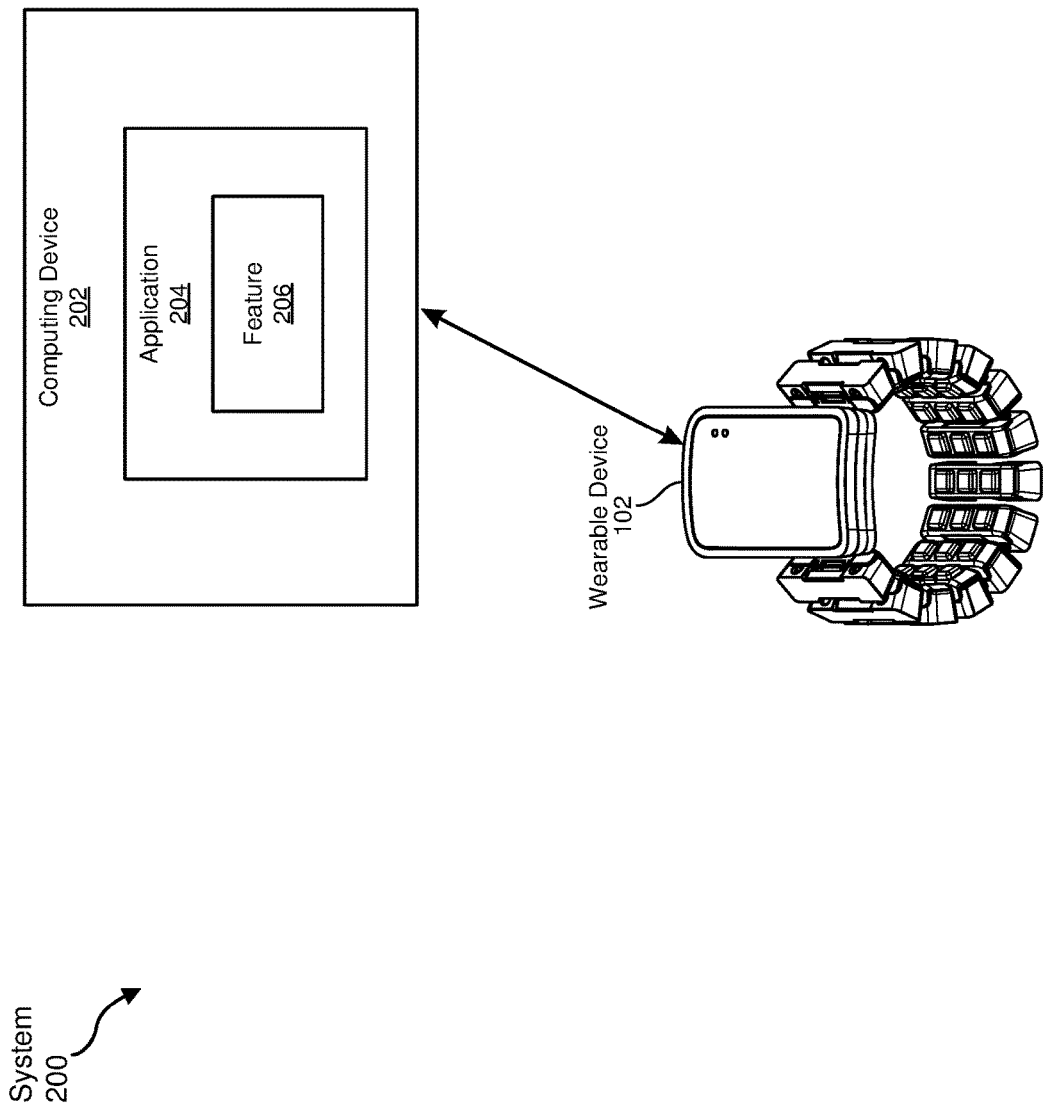
FIG. 2 is an illustration of an exemplary system for modifying features of applications based on predicted intentions of users.

FIG. 2 illustrates an exemplary system 200 that includes wearable device 102 and/or a computing device 202 in communication with one another. In some examples, wearable device 102 and computing device 202 may each include an instance of processing device 106 and/or memory 108. In addition, system 200 may include one or more additional wearable devices (not necessarily illustrated in FIG. 2) capable of implementing and/or performing any of the same functionality as wearable device 102. Accordingly, many of the tasks described above as being performed by wearable device 102 in connection with FIG. 1 may additionally or alternatively be performed by computing device 202 and/or any additional wearable devices included in system 200.

Examples of computing device 202 include, without limitation, laptops, tablets, desktops, cellular phones, smartphones, Personal Digital Assistants (PDAs), multimedia players, embedded systems, embedded processors, intention-enabled user interfaces (such as keyboards, mice, touchscreens, joysticks, joypads, etc.), wearable devices, gaming consoles, artificial-reality systems (e.g., virtual-reality devices, augmented-reality devices, and/or mixed-reality devices), variations or combinations of one or more of the same, and/or any other suitable computing devices.

In some examples, when worn on the body of a user, wearable device 102 may detect neuromuscular signals traversing the user's body via sensors 104(1)-(N). Wearable device 102 may record, store, and/or analyze those neuromuscular signals.

In some implementations, wearable device 102 may record, store, and/or analyze auxiliary position, velocity, and/or acceleration information together with the neuromuscular signals. In such implementations, wearable device 102 may perform analog processing (e.g., noise reduction, filtering, etc.) and/or analog-to-digital conversion of recorded neuromuscular signals. Wearable device 102 may communicate with computing device 202 via any suitable wireless technology, protocol, and/or signaling. In one example, wearable device 102 may provide and/or transfer the recorded neuromuscular signals, features extracted from such signals, and/or commands or instructions based on such signals to computing device 202.

In some examples, computing device 202 may receive the recorded neuromuscular signals, features extracted from such signals, and/or commands or instructions based on such signals from wearable device 102. In one example, computing device 202 may generate data, commands, and/or instructions for use or consumption by an application 204 running on computing device 202 and/or another application running on a separate computing device. In another example, computing device 202 may identify and/or determine the user's current intentions and/or emotional state with respect to application 204 by implementing and/or applying an inferential model. In this example, computing device 202 may communicate and/or disclose the identified or determined intentions and/or emotional state to application 204. For example, computing device 202 may provide application 204 with data and/or information indicative of the user feeling anger, stress, fear, calm, neutral states, relaxation, joy, happiness, and/or elation at a certain moment in time.

Application 204 may include and/or represent any type or form of suitable application capable of running on computing device 202 and/or a separate computing device. Examples of application 204 include, without limitation, communication applications, instant-messaging applications, direct-messaging applications, text-messaging applications, gaming applications, video-conferencing applications, combinations or variations of one or more of the same, and/or any other suitable application.

In some examples, wearable device 102 may generate one or more messages and/or input commands for computing device 202. In one example, such messages and/or input commands may indicate and/or identify the intentions and/or emotional states of the user of computing device 202. In another example, such messages and/or input commands may be used by computing device 202 to determine, predict, and/or infer the intentions and/or emotional states of the user. Additionally or alternatively, such messages and/or input commands may direct computing device 202 to execute one or more computer-readable instructions that cause application 204 to modify a feature 206 in one way or another to account for the intentions and/or emotional states of the user. In one embodiment, feature 206 may include and/or represent any attribute, characteristic, quality, component, and/or element of application 204.

In some examples, such messages and/or input commands may indicate and/or identify the amount of force and/or motion applied by a body part of the user as he or she operates application 204. For example, wearable device 102 may measure, identify, and/or determine the amount of linear force and/or rotational (torque) force exerted by one or more body parts based at least in part on neuromuscular signals traversing the user's body. In one example, such linear forces may include and/or represent the force of a finger or hand pressing on a solid object (e.g., a mobile phone, a keyboard, a touchscreen, a handheld controller, etc.). Additionally or alternatively, such rotational forces may include and/or represent the force created as segments in the wrist or fingers are twisted or flexed and/or the force created by twisting or flexing the user's arm or waist.

The inferential model implemented by wearable device 102 and/or computing device 202 may include and/or represent at least one statistical or machine learning model. For example, the inferential model may include and/or represent a neural network (e.g., a recurrent neural network) used to determine and/or classify the user's intentions and/or emotional states based at least in part on neuromuscular signals. In one example, the neural network may include and/or represent a long short-term memory (LSTM) neural network. Additionally or alternatively, the neural network may include and/or represent a fully recurrent neural network, a gated recurrent neural network, a recursive neural network, a Hopfield neural network, an associative memory neural network, an Elman neural network, a Jordan neural network, an echo state neural network, a second order recurrent neural network, deep neural networks, convolutional neural networks, feedforward neural networks, variations or combinations of one or more of the same, and/or any other suitable type of neural network.

In some examples, the inferential model may include and/or represent a supervised machine learning model in which the user demonstrates and/or invokes certain intentions and/or emotional states for training purposes. In such examples, the inferential model may obtain sensor data samples representative of those user intentions and/or emotional states via wearable device 102. The inferential model may then be trained (or further trained) based at least in part on those sensor data samples. In other examples, the inferential model may include and/or represent an unsupervised machine learning model that is trained without the user demonstrating and/or invoking such intentions and/or emotional states. The inferential model may also be trained from data samples collected from multiple users.

In some implementations, the recorded neuromuscular signals may exhibit spatio-temporal (e.g., spatio-frequential) patterns that depend on the way in which the user wears wearable device 102. For example, one user intention and/or emotional state may be associated with a first spatio-temporal pattern when the user is donning wearable device 102 in a first manner (e.g., where the electrodes are in contact with certain areas of the user's skin) and a second spatio-temporal pattern when the user rotates wearable device 102 on his or her body or when the user moves wearable device 102 to a different part of the body (e.g., from a lower arm position to an upper arm position). Accordingly, the inferential model may be trained to identify one or more user intentions and/or emotional states based at least in part on the exhibited spatio-temporal patterns.

In some embodiments, wearable device 102 and/or computing device 202 may be combined into a single standalone computing device or unit. In other embodiments, wearable device 102 and/or computing device 202 may each include and/or represent a separate standalone computing device or unit.

In some examples, wearable device 102 may implement and/or be configured with one or more trained inferential models. In such examples, wearable device 102 may record neuromuscular signals, use the trained inferential models to determine and/or discern user intentions and/or emotional states, and/or provide one or more indications of the user intentions and/or emotional states to computing device 202. Additionally or alternatively, wearable device 102 may communicate and/or disclose certain features extracted from the recorded neuromuscular signals and/or one or more commands or instructions based on such signals to computing device 202.

In some examples, computing device 202 may identify and/or determine the user's intentions and/or emotional states by feeding the recorded neuromuscular signals and/or certain features extracted from such signals into one or more trained inferential models. The identified states may be mapped to specific actions and/or modifications capable of being executed and/or performed by computing device 202.

As a specific example, the user donning wearable device 102 may draft a text message, a direct message, and/or an email in application 204 running on computing device 202 and/or a separate device. As the user is drafting, sensors 104(1)-(N) of wearable device 102 may sense and/or detect one or more neuromuscular signals via the body of the user.

In this example, processing device 106 of wearable device 102 may determine an intention and/or emotional state of the user in connection with the drafting based at least in part on the neuromuscular signals detected by sensors 104(1)-(N). In response to this determination, processing device 106 of wearable device 102 may then modify feature 206 of application 204 running on computing device 202 to account for the intention and/or emotional state of the user.

Continuing with this example, to achieve the modification of feature 206, processing device 106 may direct wearable device 102 to send one or more messages indicative of the user's intention and/or emotional state to computing device 202. In response to the messages received from wearable device 102, computing device 202 may modify and/or alter feature 206 of application 204 to account for the intention and/or emotional state of the user. For example, computing device 202 may embolden, italicize, and/or underline text entered into application 204 by the user to account for the intention and/or emotional state of the user. Additionally or alternatively, computing device 202 may change the font of the text and/or increase or decrease the font size of that text to account for the intention and/or emotional state of the user. Computing device 202 may also add an emoji and/or an animated sticker to the text to account for the intention and/or emotional state of the user.

In one example, the user may draft the text message, direct message, and/or email in application 204 by typing on a user interface (such as a keyboard and/or touchscreen) of computing device 202. In this example, wearable device 102 may implement and/or rely on one or more auxiliary sensors to arrive at and/or make the determination regarding the user's intention and/or emotional state in conjunction with the neuromuscular signals. For example, the auxiliary sensors of wearable device 102 may detect and/or measure the amount of force, motion, and/or speed applied by the user while typing the text message, direct message, and/or email. In this example, processing device 106 of wearable device 102 may determine that the user is experiencing anger, stress, calm, relaxation, and/or joy based at least in part on the neuromuscular signals detected via the user's body and the amount of force, motion, and/or speed applied by the user while typing. In one example, joy may be linked to and/or associated with typing fast, and a neutral state may be linked to and/or associated with a relaxed and/or calm hand. In response to this determination, processing device 106 of wearable device 102 may modify and/or alter one or more features of the text message, direct message, and/or email to account for the anger and/or stress experienced by the user while typing.

As another example, application 204 may include and/or represent a gaming application running on computing device 202. As the user plays the gaming application, sensors 104(1)-(N) of wearable device 102 may sense and/or detect one or more neuromuscular signals via the body of the user. In this example, processing device 106 of wearable device 102 may determine an intention and/or emotional state of the user in connection with the gaming application based at least in part on the neuromuscular signals detected by sensors 104(1)-(N). In response to this determination, processing device 106 of wearable device 102 may then modify feature 206 of the gaming application to account for the intention and/or emotional state of the user.

Continuing with this example, to achieve the modification of feature 206, processing device 106 may direct wearable device 102 to send one or more messages indicative of the user's intention and/or emotional state to computing device 202. In response to the messages received from wearable device 102, computing device 202 may modify and/or alter feature 206 of the gaming application to account for the intention and/or emotional state of the user. For example, computing device 202 may modify and/or alter one or more audio features and/or visual features provided to the user in connection with the gaming application. Additionally or alternatively, computing device 202 may modify and/or alter the storyline and/or artificial intelligence of the gaming application to account for the intention and/or emotional state of the user.

In one example, the user donning wearable device 102 may experience fear while playing a virtual-reality game. As the user plays the virtual-reality game, sensors 104(1)-(N) of wearable device 102 may sense and/or detect one or more neuromuscular signals via the body of the user. Processing device 106 of wearable device 102 may determine that the user is experiencing fear in connection with the virtual-reality game based at least in part on the neuromuscular signals detected by sensors 104(1)-(N). In response to this determination, processing device 106 of wearable device 102 may modify and/or alter one or more audio and/or visual features of the virtual-reality game to account for the fear experienced by the user while playing the virtual-reality game. Additionally or alternatively, processing device 106 of wearable device 102 may modify and/or alter the storyline and/or artificial intelligence of the virtual-reality game to account for the fear experienced by the user while playing the virtual-reality game.

Figure 8:
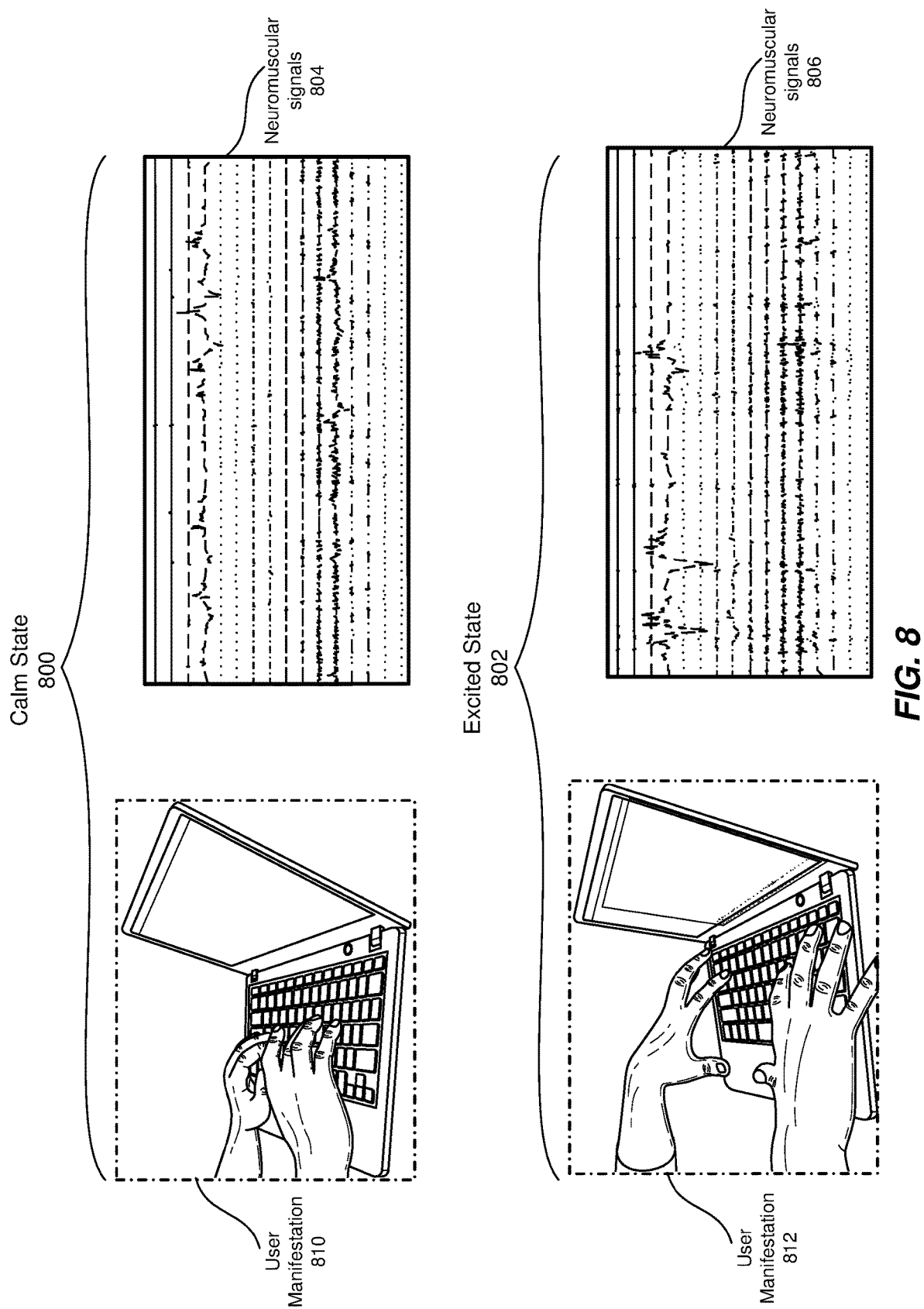
FIG. 8 is an illustration of an exemplary calm state and an exemplary excited state experienced by a user operating an application.

FIGS. 8-11 illustrate various exemplary intentions of a user while operating application 204 as well as various exemplary neuromuscular signals corresponding to the user's intentions. As illustrated in FIG. 8, a user donning wearable device 102 may experience a calm state 800 while typing on his or her computer in connection with application 204. In one example, the user may make and/or perform a user manifestation 810 of calm state 800. In this example, calm state 800 and/or user manifestation 810 may cause the user to generate neuromuscular signals 804 that traverse his or her body. As the user experiences calm state 800 and/or performs user manifestation 810, wearable device 102 may sense and/or detect one or more of neuromuscular signals 804 via the user's body and then determine that the user is experiencing calm state 800 based at least in part on neuromuscular signals 804.

As further illustrated in FIG. 8, the user donning wearable device 102 may experience an excited state 802 while typing on his or her computer in connection with application 204. In one example, the user may make and/or perform a user manifestation 812 of excited state 802. In this example, excited state 802 and/or user manifestation 812 may cause the user to generate neuromuscular signals 806 that traverse his or her body. As the user experiences excited state 802 and/or performs user manifestation 812, wearable device 102 may sense and/or detect one or more of neuromuscular signals 806 via the user's body and then determine that the user is experiencing excited state 802 based at least in part on neuromuscular signals 806.

As illustrated in FIG. 9, the user donning wearable device 102 may experience an angry state 900 while typing on his or her computer in connection with application 204. In one example, the user may make and/or perform a user manifestation 910 of angry state 900. Additionally or alternatively, the user may exhibit and/or manifest a banging 912 on his or her computer in connection with angry state 900. In these examples, angry state 900, user manifestation 910, and/or banging 912 may cause the user to generate neuromuscular signals 902 that traverse his or her body. As the user experiences angry state 900 and/or performs user manifestation 910 or banging 912, wearable device 102 may sense and/or detect one or more of neuromuscular signals 902 via the user's body and then determine that the user is experiencing angry state 900 based at least in part on neuromuscular signals 902.

Figure 10:
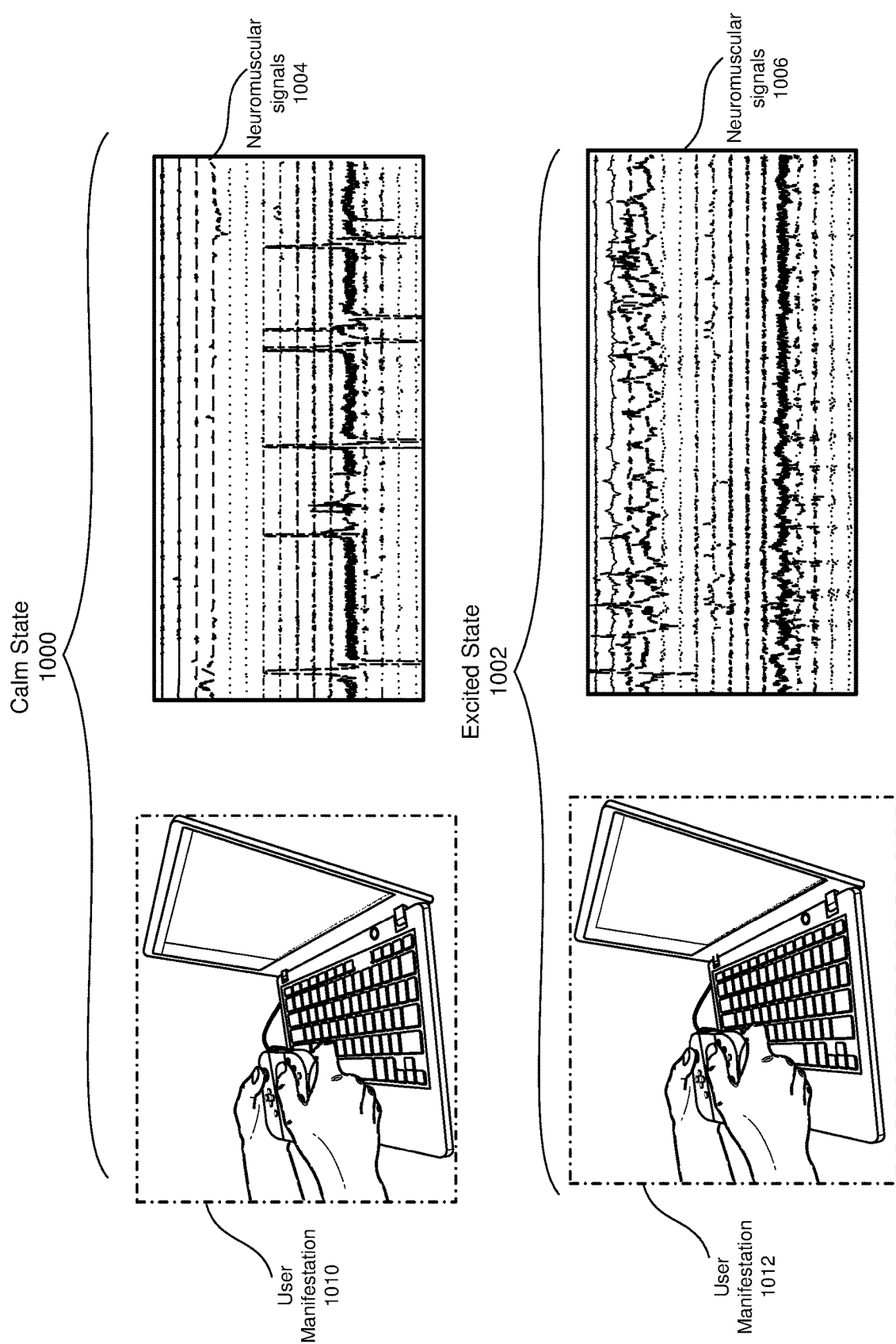
FIG. 10 is an illustration of an exemplary calm state and an exemplary excited state experienced by a user operating an application.

As illustrated in FIG. 10, a user donning wearable device 102 may experience a calm state 1000 while controlling application 204 via a gaming controller. In one example, the user may make and/or perform a user manifestation 1010 of calm state 1000. In this example, calm state 1000 and/or user manifestation 1010 may cause the user to generate neuromuscular signals 1004 that traverse his or her body. As the user experiences calm state 1000 and/or performs user manifestation 1010, wearable device 102 may sense and/or detect one or more of neuromuscular signals 1004 via the user's body and then determine that the user is experiencing calm state 1000 based at least in part on neuromuscular signals 1004.

As further illustrated in FIG. 10, the user donning wearable device 102 may experience an excited state 1002 while controlling application 204 via the gaming controller. In one example, the user may make and/or perform a user manifestation 1012 of excited state 1002. In this example, excited state 1002 and/or user manifestation 1012 may cause the user to generate neuromuscular signals 1006 that traverse his or her body. As the user experiences excited state 1002 and/or performs user manifestation 1012, wearable device 102 may sense and/or detect one or more of neuromuscular signals 1006 via the user's body and then determine that the user is experiencing excited state 1002 based at least in part on neuromuscular signals 1006.

Figure 11:
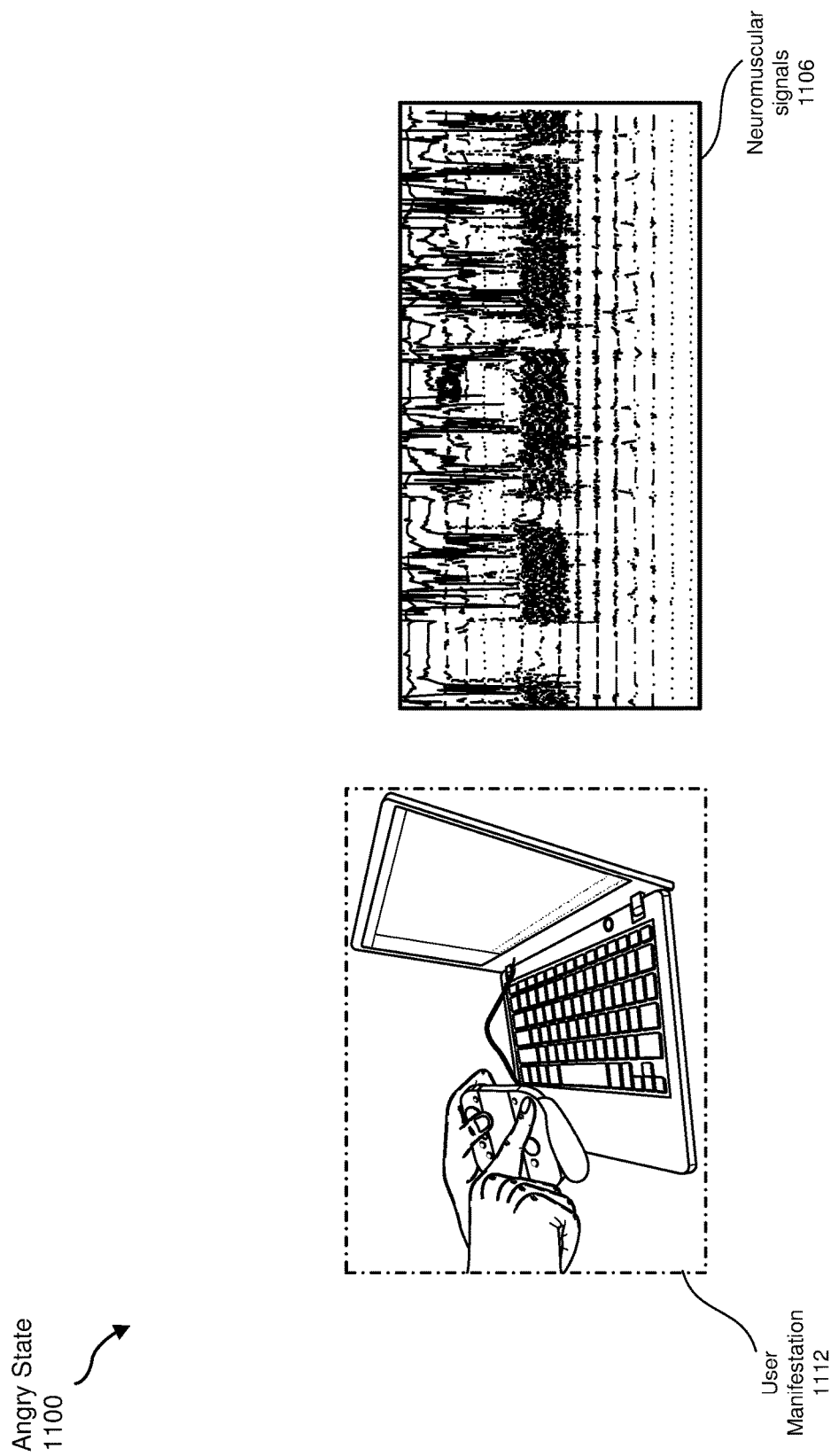
FIG. 11 is an illustration of an exemplary angry state experienced by a user operating an application.

As illustrated in FIG. 11, the user donning wearable device 102 may experience an angry state 1100 while controlling application 204 via the gaming controller. In one example, the user may make and/or perform a user manifestation 1112 of angry state 1100. In this example, angry state 1100 and/or user manifestation 1112 may cause the user to generate neuromuscular signals 1106 that traverse his or her body. As the user experiences angry state 1100 and/or performs user manifestation 1112, wearable device 102 may sense and/or detect one or more of neuromuscular signals 1106 via the user's body and then determine that the user is experiencing angry state 1100 based at least in part on neuromuscular signals 1106.

Figure 3:
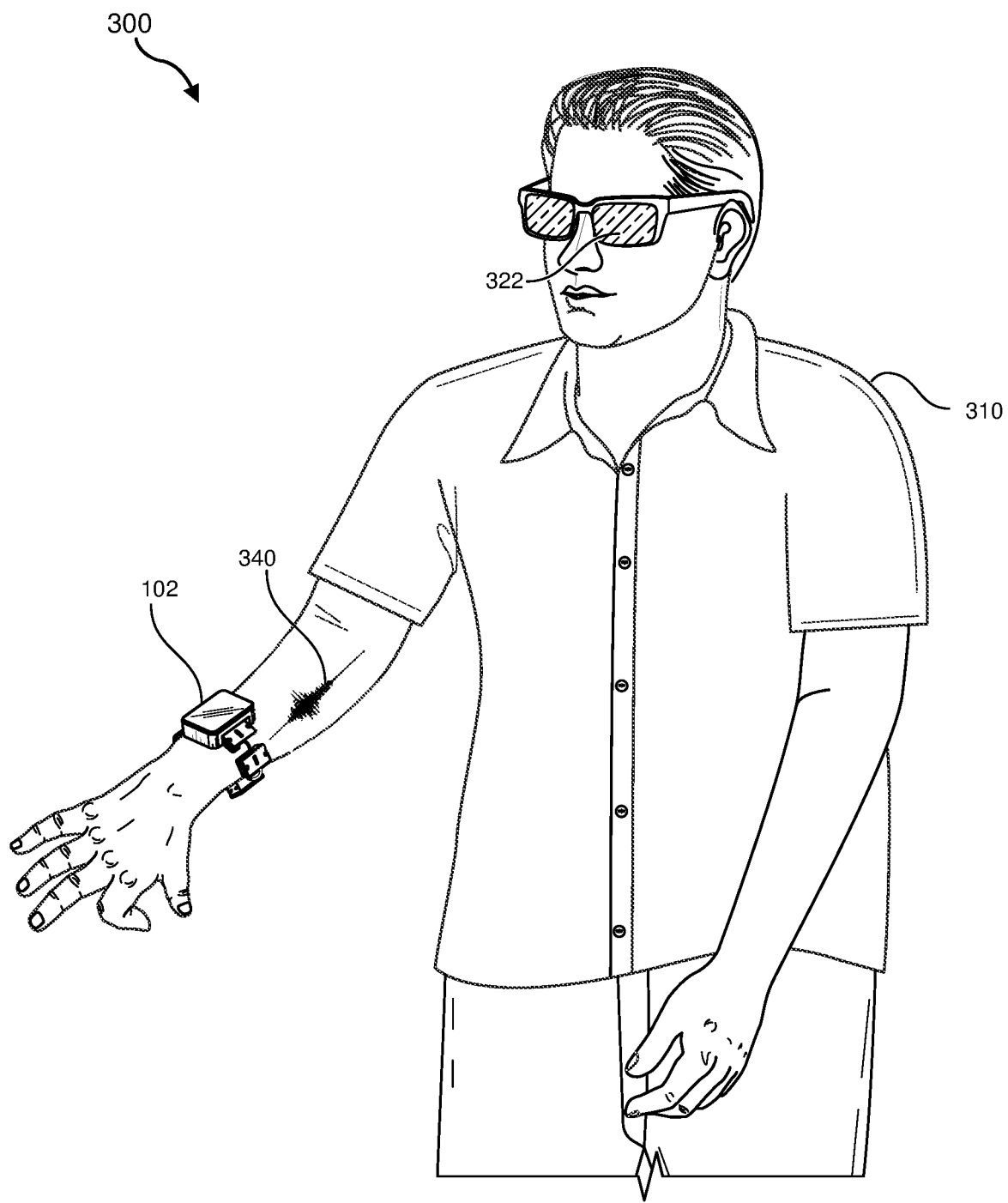
FIG. 3 is an illustration of an exemplary implementation of modifying features of applications based on predicted intentions of users.

FIG. 3 is an illustration of an exemplary implementation 300 in which a user 310 is donning and/or operating wearable device 102 for modifying applications based on predicted user intentions. In one example, wearable device 102 may be communicatively coupled to a head-mounted display 322. In this example, wearable device 102 may be able to discern and/or identify the user's intention and/or emotional state based at least in part on neuromuscular signals 340 detected via the user's right arm. Wearable device 102 may then direct head-mounted display 322 to manipulate and/or alter one or more audio and/or visual elements presented via head-mounted display 322 to account for the user's intention and/or emotional state.

Figure 4:
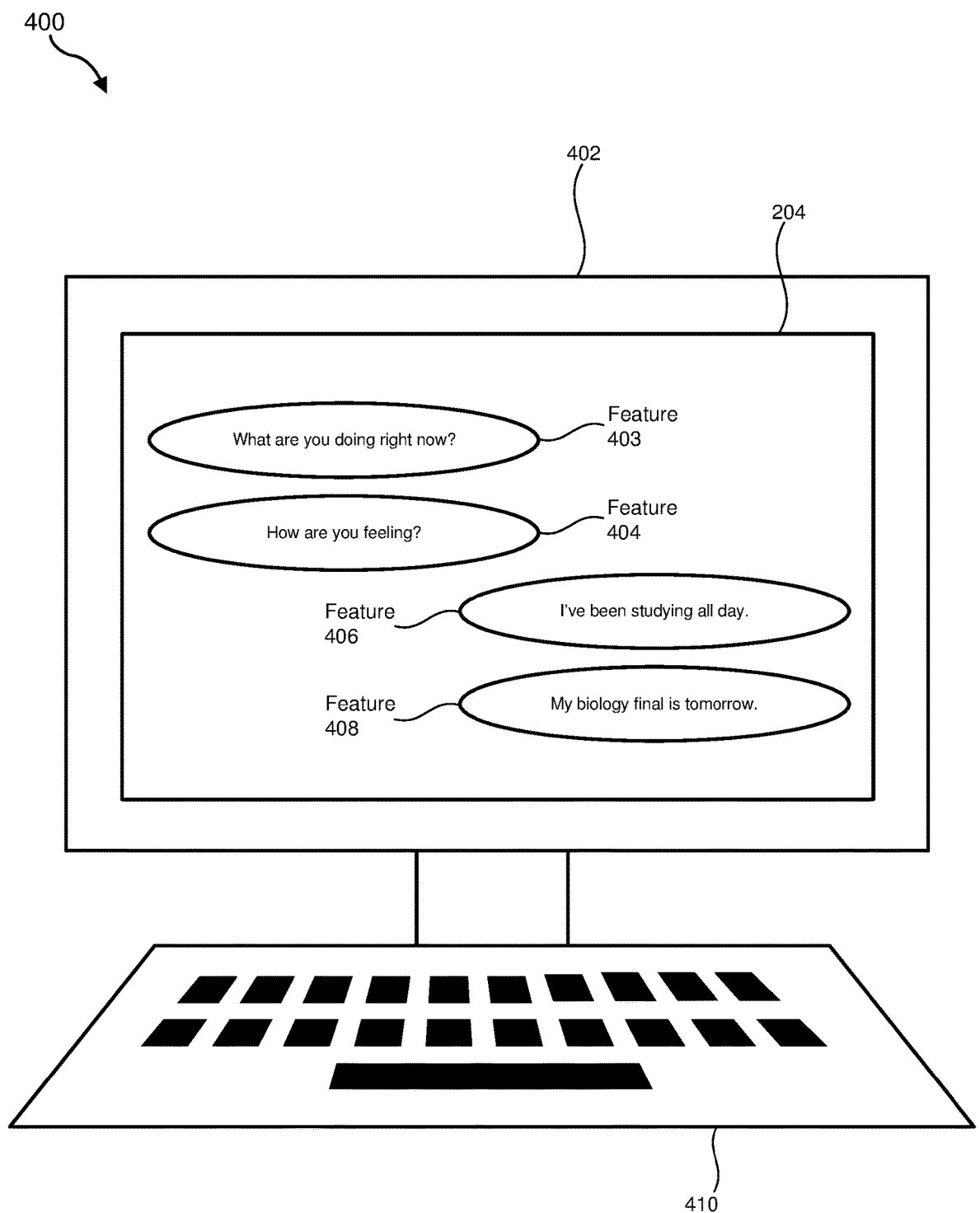
FIG. 4 is an illustration of an exemplary implementation of modifying features of applications based on predicted intentions of users.

FIG. 4 is an illustration of an exemplary implementation 400 of modifying features of applications based on predicted intentions of users. As illustrated in FIG. 4, implementation 400 may involve a computer 402 executing application 204. In one example, a user donning wearable device 102 may be operating and/or controlling computing device 202. In this example, the user may engage in an instant-messaging conversation facilitated by application 204 running on computing device 202. The user may type his or her instant messages via a keyboard 410 of computer 402.

As illustrated in FIG. 4, the instant-messaging conversation facilitated by application 204 may include and/or represent features 403, 404, 406, and 408. In one example, features 403 and 404 may include and/or represent instant messages (e.g., "What are you doing right now?" and "How are you feeling?") sent by another party to the user. In this example, features 406 and 408 may include and/or represent instant messages (e.g., "I've been studying all day." and "My biology final is tomorrow.") sent by the user to the other party.

Figure 5:
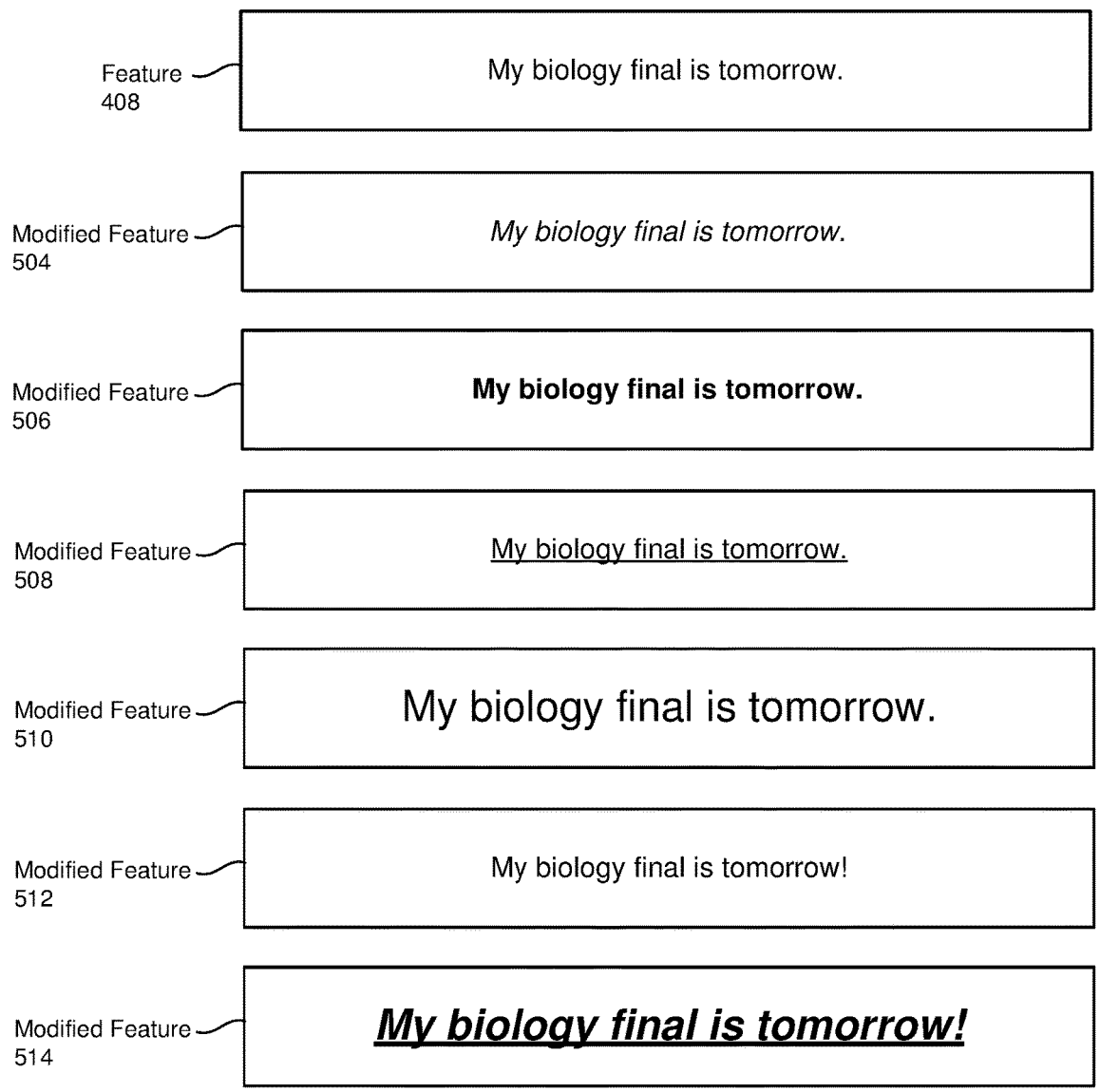
FIG. 5 is an illustration of an exemplary application whose features are modified based at least in part on the intentions of users.
Figure 6:
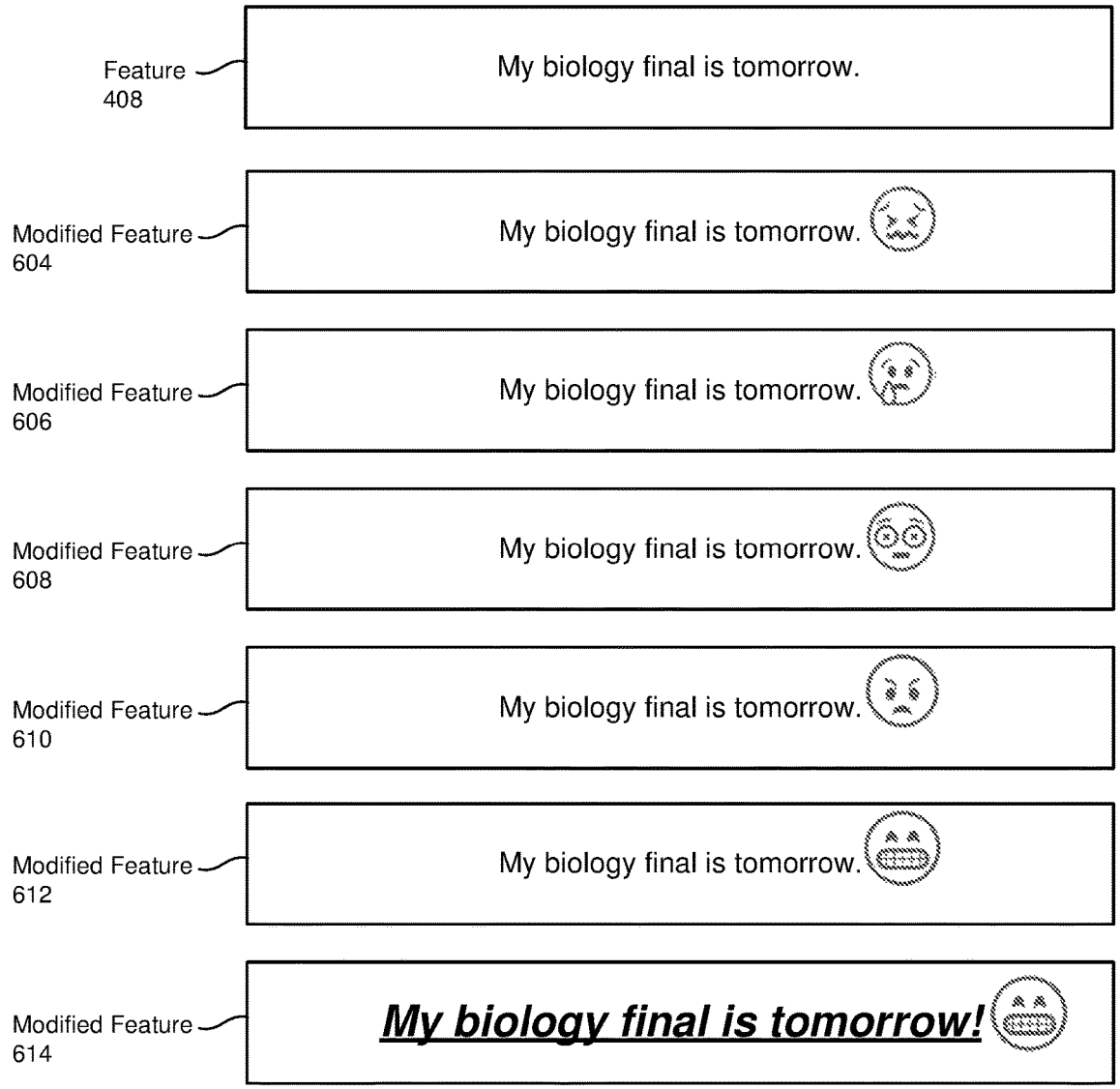
FIG. 6 is an illustration of an exemplary application whose features are modified based at least in part on the intentions of users.

FIGS. 5 and 6 are illustrations of exemplary modifications made and/or applied to feature 408 of application 204. As illustrated in FIGS. 5 and 6, feature 408 may be modified and/or altered in a variety of different ways to account for a user's intention and/or emotional state. For example, computer 402 may direct and/or cause application 204 to modify and/or alter feature 408 by italicizing the corresponding text to form a modified feature 504 in FIG. 5. In another example, computer 402 may direct and/or cause application 204 to modify and/or alter feature 408 by emboldening the corresponding text to form a modified feature 506 in FIG. 5. In a further example, computer 402 may direct and/or cause application 204 to modify and/or alter feature 408 by underlining the corresponding text to form a modified feature 508 in FIG. 5.

In an additional example, computer 402 may direct and/or cause application 204 to modify and/or alter feature 408 by increasing the font size of the corresponding text to form a modified feature 510 in FIG. 5. In yet another example, computer 402 may direct and/or cause application 204 to modify and/or alter feature 408 by changing the punctuation (e.g., from a period to an exclamation mark) in the corresponding text to form a modified feature 512 in FIG. 5. Finally, computer 402 may direct and/or cause application 204 to modify and/or alter feature 408 by emboldening, underlining, italicizing, increasing the font size of, and changing the punctuation in the corresponding text to form a modified feature 514 in FIG. 5. Upon completion of such a modification and/or alteration, computer 402 may send the instant message to the other party via application 204.

In one example, computer 402 may direct and/or cause application 204 to modify and/or alter feature 408 by appending a confounded-face emoji to the corresponding text to form a modified feature 604 in FIG. 6. In another example, computer 402 may direct and/or cause application 204 to modify and/or alter feature 408 by appending a crying-face emoji to the corresponding text to form a modified feature 606 in FIG. 6. In a further example, computer 402 may direct and/or cause application 204 to modify and/or alter feature 408 by appending a flushed-face emoji to the corresponding text to form a modified feature 608 in FIG. 6.

In an additional example, computer 402 may direct and/or cause application 204 to modify and/or alter feature 408 by appending an angry-face emoji to the corresponding text to form a modified feature 610 in FIG. 6. In a yet another example, computer 402 may direct and/or cause application 204 to modify and/or alter feature 408 by appending a grimacing-face emoji to the corresponding text to form a modified feature 612 in FIG. 6. Finally, computer 402 may direct and/or cause application 204 to modify and/or alter feature 408 by emboldening, underlining, italicizing, increasing the font size of, changing the punctuation in, and/or appending a grimacing-face emoji to the corresponding text to form a modified feature 614 in FIG. 6. Upon completion of such a modification and/or alteration, computer 402 may send the instant message to the other party via application 204.

In some examples, computer 402 may provide, for presentation to the user, a prompt and/or dialog that enables the user to confirm or deny the intention of the user as determined by processing device 106. In such examples, computer 402 may receive, from the user, input confirming the intention of the user as determined by processing device 106. Upon receiving the input from the user, computer 402 may modify feature 408 of application 204 to account for the intention of the user.

In other examples, computer 402 may receive, from the user, input denying and/or rejecting the intention of the user as determined by processing device 106. Upon receiving the input from the user, computer 402 may avoid and/or refrain from modifying feature 408 of application 204 due at least in part to the user's denial and/or rejection of the determined intention.

Figure 7:
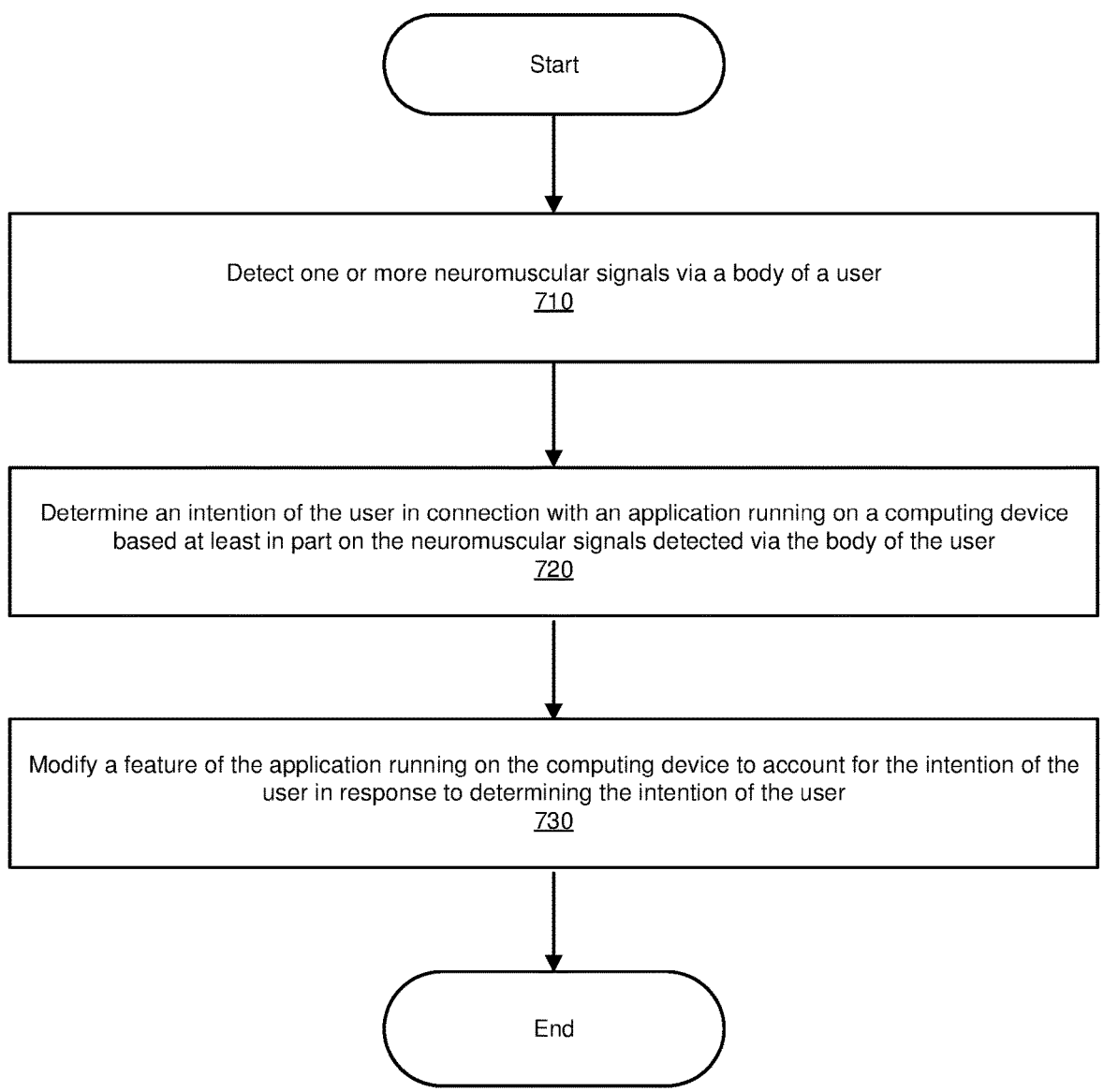
FIG. 7 is a flow diagram of an exemplary method for modifying features of applications based on predicted intentions of users.

FIG. 7 is a flow diagram of an exemplary method 700 for modifying features of applications based on predicted intentions of users. The steps shown in FIG. 7 may be performed by a wearable device and/or a computing device communicatively coupled to the wearable device. Additionally or alternatively, the steps shown in FIG. 7 may also incorporate and/or involve various sub-steps and/or variations consistent with the descriptions provided above in connection with FIGS. 1-6.

As illustrated in FIG. 7, method 700 may include a step 710 in which a set of sensors incorporated into a wearable donned by a user detects one or more neuromuscular signals via a body of the user. In one example, the sensors incorporated into the wearable may detect some neuromuscular signals traversing the user's body as the user operates an application running on a computing device. In this example, the user may experience and/or develop certain intentions in connection with the application running on the computing device. The neuromuscular signals detected by the sensors may reflect and/or be indicative of those intentions.

As illustrated in FIG. 7, method 700 may also include a step 720 in which an intention of the user is determined in connection with the application based at least in part on the neuromuscular signals detected via the body of the user. In one example, a processing device communicatively coupled to the sensors may determine an intention of the user based at least in part on the neuromuscular signals detected via the body of the user. In this example, the intention of the user may correspond to and/or represent the emotional state of the user while operating the application.

As illustrated in FIG. 7, method 700 may also include a step 730 in which a feature of the application running on the computing device is modified to account for the intention of the user. In one example, the processing device communicatively coupled to the sensors may modify and/or alter a feature of the application running on the computing device to account for the intention of the user. For example, the processing device may achieve the modification of the feature by sending one or more messages indicative of the user's intention to the computing device on which the application is running. In response to receiving such messages, the computing device may cause the application to modify and/or alter the feature to account for the user's intention.

EXAMPLE EMBODIMENTS

Example 1: A system may include (1) a wearable dimensioned to be donned on a body of a user of a computing device (2) a set of sensors coupled to the wearable, wherein the set of sensors detect one or more neuromuscular signals via the body of the user, and (3) at least one processing device communicatively coupled to the set of sensors, wherein the processing device (A) determines, based at least in part on the neuromuscular signals detected by the set of sensors, an intention of the user in connection with an application running on the computing device and, in response to determining the intention of the user, (B) modifying a feature of the application running on the computing device to account for the intention of the user.

Example 2: The system of Example 1, wherein the processing device may be communicatively coupled to the computing device, and to modify the feature of the application, the processing device may send at least one message indicative of the intention of the user to the computing device.

Example 3: The system of any of Examples 1 and 2, wherein the application running on the computing device may include a communication application, and the message sent by the processing device may cause the communication application to modify an attribute of text entered into the communication application by the user.

Example 4: The system of any of Examples 1-3, wherein the attribute of the text may include an emboldening feature of the text, an italicizing feature of the text, an underlining feature of the text, a font size of the text, or a font of the text.

Example 5: The system of any of Examples 1-4, wherein the application running on the computing device may include a communication application, and the message sent by the processing device may cause the communication application to add an emoji or an animated sticker to an outgoing communication created by the user in the communication application.

Example 6: The system of any of Examples 1-5, wherein the application running on the computing device may include a gaming application, and the message sent by the processing device may cause the gaming application to modify an audio feature or a visual feature provided by the computing device to the user.

Example 7: The system of any of Examples 1-6, wherein (1) to determine the intention of the user, the processing device may identify an emotional state of the user as the user operates the application running on the computing device, and (2) to modify the feature of the application, the processing device may notify the application of the emotional state of the user to enable the application to modify the feature based at least in part on the emotional state of the user.

Example 8: The system of any of Examples 1-7, wherein the emotional state of the user may include an angry state, a stressed state, a fearful state, a calm state, and/or a happy state.

Example 9: The system of any of Examples 1-8, further including at least one motion sensor coupled to the wearable, wherein the motion sensor may measure one or more motions exhibited by the user while operating the application running on the computing device, and the processing device may be communicatively coupled to the motion sensor and may determine the intention of the user based at least in part on the neuromuscular signals detected by the set of sensors and the motions measured by the motion sensor.

Example 10: The system of any of Examples 1-9, wherein the motion sensor may include an accelerometer, a gyroscope, a magnetometer, or an inertial measurement unit.

Example 11: The system of any of Examples 1-10, wherein the wearable may include a wristband dimensioned to be donned on a wrist of the user.

Example 12: The system of any of Examples 1-11, wherein the computing device may include a mobile phone, a computer, an artificial-reality system, a gaming platform, or a smart watch.

Example 13: The system of any of Examples 1-12, wherein the computing device may (1) provide, for presentation to the user, a prompt that enables the user to confirm or deny the intention of the user as determined by the processing device, (2) receives, from the user, input confirming the intention of the user as determined by the processing device, and upon receiving the input from the user, (3) modifying the feature of the application running on the computing device to account for the intention of the user.

Example 14: A wearable device may (1) a set of sensors that detect one or more neuromuscular signals via a body of a user, and (2) at least one processing device communicatively coupled to the set of sensors, wherein the processing device (A) determines, based at least in part on the neuromuscular signals detected by the set of sensors, an intention of the user in connection with an application running on the computing device and, in response to determining the intention of the user, (B) modifying a feature of the application running on the computing device to account for the intention of the user.

Example 15: The wearable device of Example 14, wherein the processing device may be communicatively coupled to the computing device, and to modify the feature of the application, the processing device may send at least one message indicative of the intention of the user to the computing device.

Example 16: The wearable device of any of Examples 14 and 15, wherein the application running on the computing device may include a communication application, and the message sent by the processing device may cause the communication application to modify an attribute of text entered into the communication application by the user.

Example 17: The wearable device of any of Examples 14-16, wherein the attribute of the text may include an emboldening feature of the text, an italicizing feature of the text, an underlining feature of the text, a font size of the text, or a font of the text.

Example 18: The wearable device of any of Examples 14-17, wherein the application running on the computing device may include a communication application, and the message sent by the processing device may cause the communication application to add an emoji or an animated sticker to an outgoing communication created by the user in the communication application.

Example 19: The wearable device of any of Examples 14-18, wherein the application running on the computing device may include a gaming application, and the message sent by the processing device may cause the gaming application to modify an audio feature or a visual feature provided by the computing device to the user.

Example 20: A method may include (1) detecting, by a set of sensors incorporated into a wearable donned by a user of a computing device, one or more neuromuscular signals via a body of the user, (2) determining, by at least one processing device communicatively coupled to the set of sensors, an intention of the user in connection with an application running on the computing device based at least in part on the neuromuscular signals detected via the body of the user, and then (3) modifying, by the processing device in response to determining the intention of the user, a feature of the application running on the computing device to account for the intention of the user.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to regulate the pressure level of an actuator, use the result of the transformation to regulate the pressure level of the actuator, and store the result of the transformation to for future reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1200 in FIG.

Figure 13:
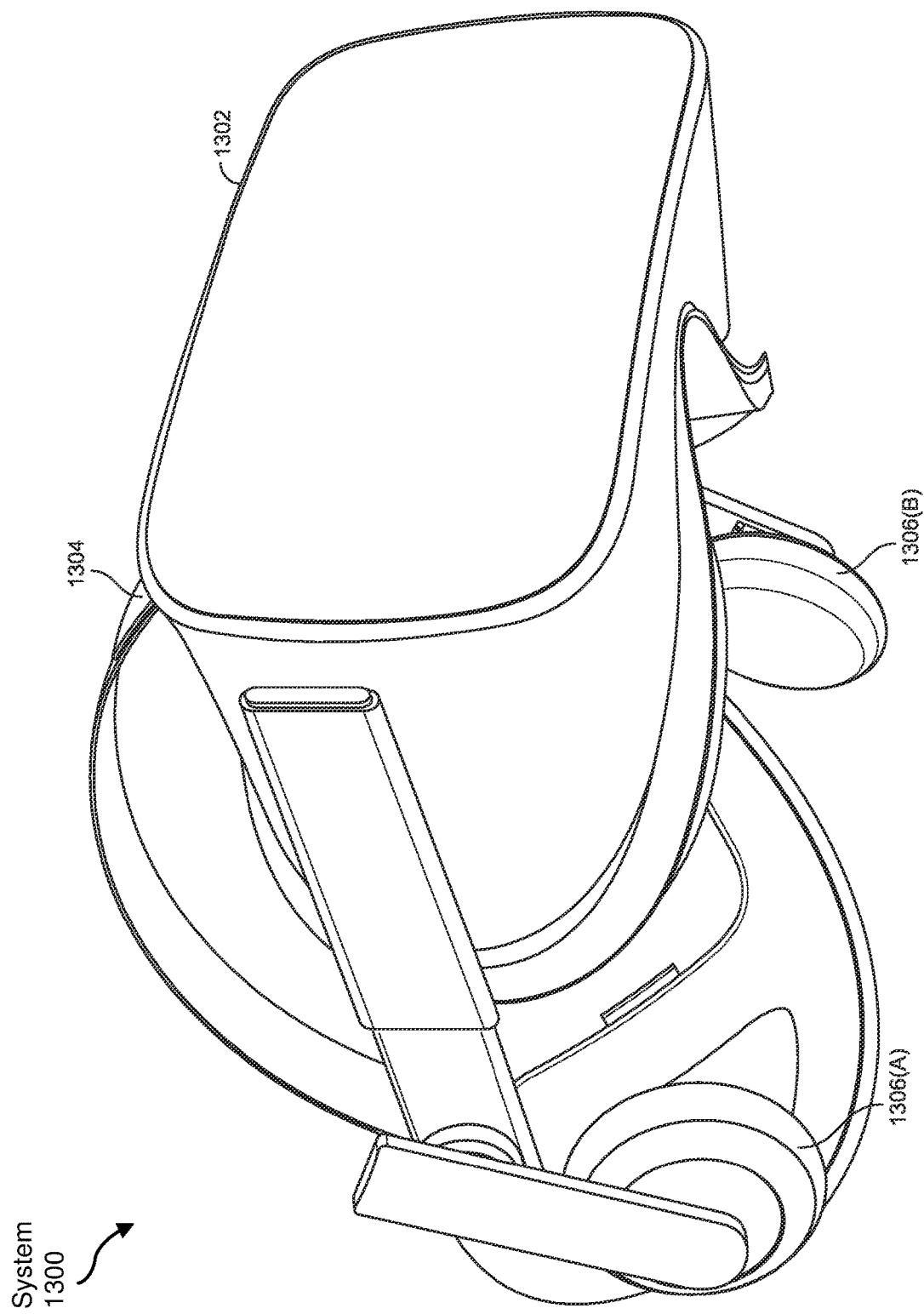
FIG. 13 is an illustration of an exemplary virtual-reality headset that may be used in connection with embodiments of this disclosure.

12) or that visually immerses a user in an artificial reality (such as, e.g., virtual-reality system 1300 in FIG. 13). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 12:
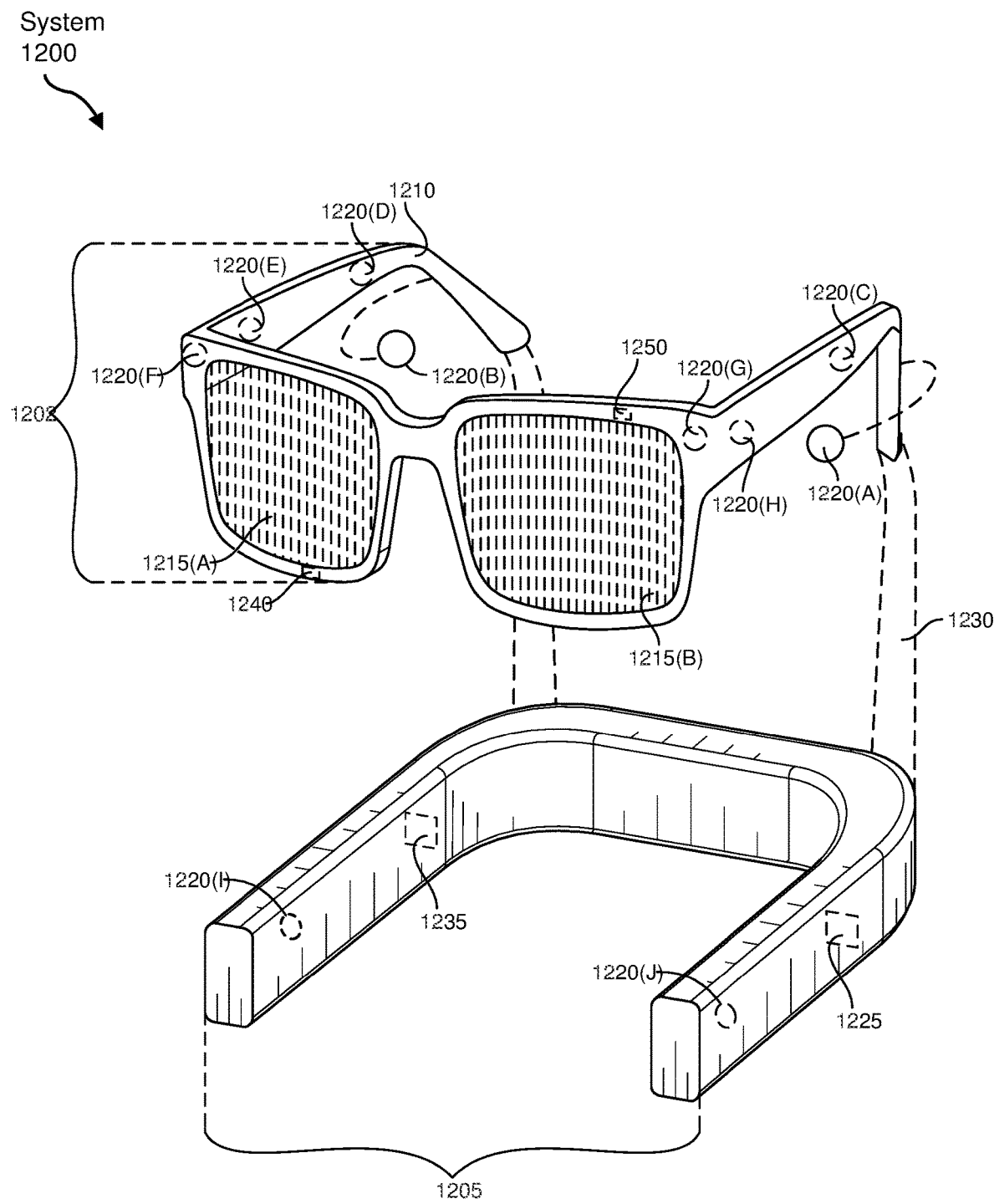
FIG. 12 is an illustration of exemplary augmented-reality glasses that may be used in connection with embodiments of this disclosure.

Turning to FIG. 12, augmented-reality system 1200 may include an eyewear device 1202 with a frame 1210 configured to hold a left display device 1215(A) and a right display device 1215(B) in front of a user's eyes. Display devices 1215(A) and 1215(B) may act together or independently to present an image or series of images to a user. While augmented-reality system 1200 includes two displays, embodiments of this disclosure may be implemented in augmented-reality systems with a single NED or more than two NEDs.

In some embodiments, augmented-reality system 1200 may include one or more sensors, such as sensor 1240. Sensor 1240 may generate measurement signals in response to motion of augmented-reality system 1200 and may be located on substantially any portion of frame 1210. Sensor 1240 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1200 may or may not include sensor 1240 or may include more than one sensor. In embodiments in which sensor 1240 includes an IMU, the IMU may generate calibration data based on measurement signals from sensor 1240. Examples of sensor 1240 may include, without limitation, accelerometers, gyroscopes, magnetometers, other suitable types of sensors that detect motion, sensors used for error correction of the IMU, or some combination thereof.

In some examples, augmented-reality system 1200 may also include a microphone array with a plurality of acoustic transducers 1220(A)-1220(J), referred to collectively as acoustic transducers 1220. Acoustic transducers 1220 may represent transducers that detect air pressure variations induced by sound waves. Each acoustic transducer 1220 may be configured to detect sound and convert the detected sound into an electronic format (e.g., an analog or digital format). The microphone array in FIG. 12 may include, for example, ten acoustic transducers: 1220(A) and 1220(B), which may be designed to be placed inside a corresponding ear of the user, acoustic transducers 1220(C), 1220(D), 1220(E), 1220(F), 1220(G), and 1220(H), which may be positioned at various locations on frame 1210, and/or acoustic transducers 1220(I) and 1220(J), which may be positioned on a corresponding neckband 1205.

In some embodiments, one or more of acoustic transducers 1220(A)-(J) may be used as output transducers (e.g., speakers). For example, acoustic transducers 1220(A) and/or 1220(B) may be earbuds or any other suitable type of headphone or speaker.

The configuration of acoustic transducers 1220 of the microphone array may vary. While augmented-reality system 1200 is shown in FIG. 12 as having ten acoustic transducers 1220, the number of acoustic transducers 1220 may be greater or less than ten. In some embodiments, using higher numbers of acoustic transducers 1220 may increase the amount of audio information collected and/or the sensitivity and accuracy of the audio information. In contrast, using a lower number of acoustic transducers 1220 may decrease the computing power required by an associated controller 1250 to process the collected audio information. In addition, the position of each acoustic transducer 1220 of the microphone array may vary. For example, the position of an acoustic transducer 1220 may include a defined position on the user, a defined coordinate on frame 1210, an orientation associated with each acoustic transducer 1220, or some combination thereof.

Acoustic transducers 1220(A) and 1220(B) may be positioned on different parts of the user's ear, such as behind the pinna, behind the tragus, and/or within the auricle or fossa. Or, there may be additional acoustic transducers 1220 on or surrounding the ear in addition to acoustic transducers 1220 inside the ear canal. Having an acoustic transducer 1220 positioned next to an ear canal of a user may enable the microphone array to collect information on how sounds arrive at the ear canal. By positioning at least two of acoustic transducers 1220 on either side of a user's head (e.g., as binaural microphones), augmented-reality device 1200 may simulate binaural hearing and capture a 3D stereo sound field around about a user's head. In some embodiments, acoustic transducers 1220(A) and 1220(B) may be connected to augmented-reality system 1200 via a wired connection 1230, and in other embodiments acoustic transducers 1220(A) and 1220(B) may be connected to augmented-reality system 1200 via a wireless connection (e.g., a BLUETOOTH connection). In still other embodiments, acoustic transducers 1220(A) and 1220(B) may not be used at all in conjunction with augmented-reality system 1200.

Acoustic transducers 1220 on frame 1210 may be positioned in a variety of different ways, including along the length of the temples, across the bridge, above or below display devices 1215(A) and 1215(B), or some combination thereof. Acoustic transducers 1220 may also be oriented such that the microphone array is able to detect sounds in a wide range of directions surrounding the user wearing the augmented-reality system 1200. In some embodiments, an optimization process may be performed during manufacturing of augmented-reality system 1200 to determine relative positioning of each acoustic transducer 1220 in the microphone array.

In some examples, augmented-reality system 1200 may include or be connected to an external device (e.g., a paired device), such as neckband 1205. Neckband 1205 generally represents any type or form of paired device. Thus, the following discussion of neckband 1205 may also apply to various other paired devices, such as charging cases, smart watches, smart phones, wrist bands, other wearable devices, hand-held controllers, tablet computers, laptop computers, other external compute devices, etc.

As shown, neckband 1205 may be coupled to eyewear device 1202 via one or more connectors. The connectors may be wired or wireless and may include electrical and/or non-electrical (e.g., structural) components. In some cases, eyewear device 1202 and neckband 1205 may operate independently without any wired or wireless connection between them. While FIG. 12 illustrates the components of eyewear device 1202 and neckband 1205 in example locations on eyewear device 1202 and neckband 1205, the components may be located elsewhere and/or distributed differently on eyewear device 1202 and/or neckband 1205. In some embodiments, the components of eyewear device 1202 and neckband 1205 may be located on one or more additional peripheral devices paired with eyewear device 1202, neckband 1205, or some combination thereof.

Pairing external devices, such as neckband 1205, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1200 may be provided by a paired device or shared between a paired device and an eyewear device, thus reducing the weight, heat profile, and form factor of the eyewear device overall while still retaining desired functionality. For example, neckband 1205 may allow components that would otherwise be included on an eyewear device to be included in neckband 1205 since users may tolerate a heavier weight load on their shoulders than they would tolerate on their heads. Neckband 1205 may also have a larger surface area over which to diffuse and disperse heat to the ambient environment. Thus, neckband 1205 may allow for greater battery and computation capacity than might otherwise have been possible on a stand-alone eyewear device. Since weight carried in neckband 1205 may be less invasive to a user than weight carried in eyewear device 1202, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1205 may be communicatively coupled with eyewear device 1202 and/or to other devices. These other devices may provide certain functions (e.g., tracking, localizing, depth mapping, processing, storage, etc.) to augmented-reality system 1200. In the embodiment of FIG. 12, neckband 1205 may include two acoustic transducers (e.g., 1220(1) and 1220(J)) that are part of the microphone array (or potentially form their own microphone subarray). Neckband 1205 may also include a controller 1225 and a power source 1235.

Acoustic transducers 1220(1) and 1220(J) of neckband 1205 may be configured to detect sound and convert the detected sound into an electronic format (analog or digital). In the embodiment of FIG. 12, acoustic transducers 1220(1) and 1220(J) may be positioned on neckband 1205, thereby increasing the distance between the neckband acoustic transducers 1220(1) and 1220(J) and other acoustic transducers 1220 positioned on eyewear device 1202. In some cases, increasing the distance between acoustic transducers 1220 of the microphone array may improve the accuracy of beamforming performed via the microphone array. For example, if a sound is detected by acoustic transducers 1220(C) and 1220(D) and the distance between acoustic transducers 1220(C) and 1220(D) is greater than, e.g., the distance between acoustic transducers 1220(D) and 1220(E), the determined source location of the detected sound may be more accurate than if the sound had been detected by acoustic transducers 1220(D) and 1220(E).

Controller 1225 of neckband 1205 may process information generated by the sensors on neckband 1205 and/or augmented-reality system 1200. For example, controller 1225 may process information from the microphone array that describes sounds detected by the microphone array. For each detected sound, controller 1225 may perform a direction-of-arrival (DOA) estimation to estimate a direction from which the detected sound arrived at the microphone array. As the microphone array detects sounds, controller 1225 may populate an audio data set with the information. In embodiments in which augmented-reality system 1200 includes an inertial measurement unit, controller 1225 may compute all inertial and spatial calculations from the IMU located on eyewear device 1202. A connector may convey information between augmented-reality system 1200 and neckband 1205 and between augmented-reality system 1200 and controller 1225. The information may be in the form of optical data, electrical data, wireless data, or any other transmittable data form. Moving the processing of information generated by augmented-reality system 1200 to neckband 1205 may reduce weight and heat in eyewear device 1202, making it more comfortable to the user.

Power source 1235 in neckband 1205 may provide power to eyewear device 1202 and/or to neckband 1205. Power source 1235 may include, without limitation, lithium ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1300 in FIG. 13, that mostly or completely covers a user's field of view. Virtual-reality system 1300 may include a front rigid body 1302 and a band 1304 shaped to fit around a user's head. Virtual-reality system 1300 may also include output audio transducers 1306(A) and 1306(B). Furthermore, while not shown in FIG. 13, front rigid body 1302 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1200 and/or virtual-reality system 1300 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1200 and/or virtual-reality system 1300 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1200 and/or virtual-reality system 1300 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1200 and 1300 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 14:
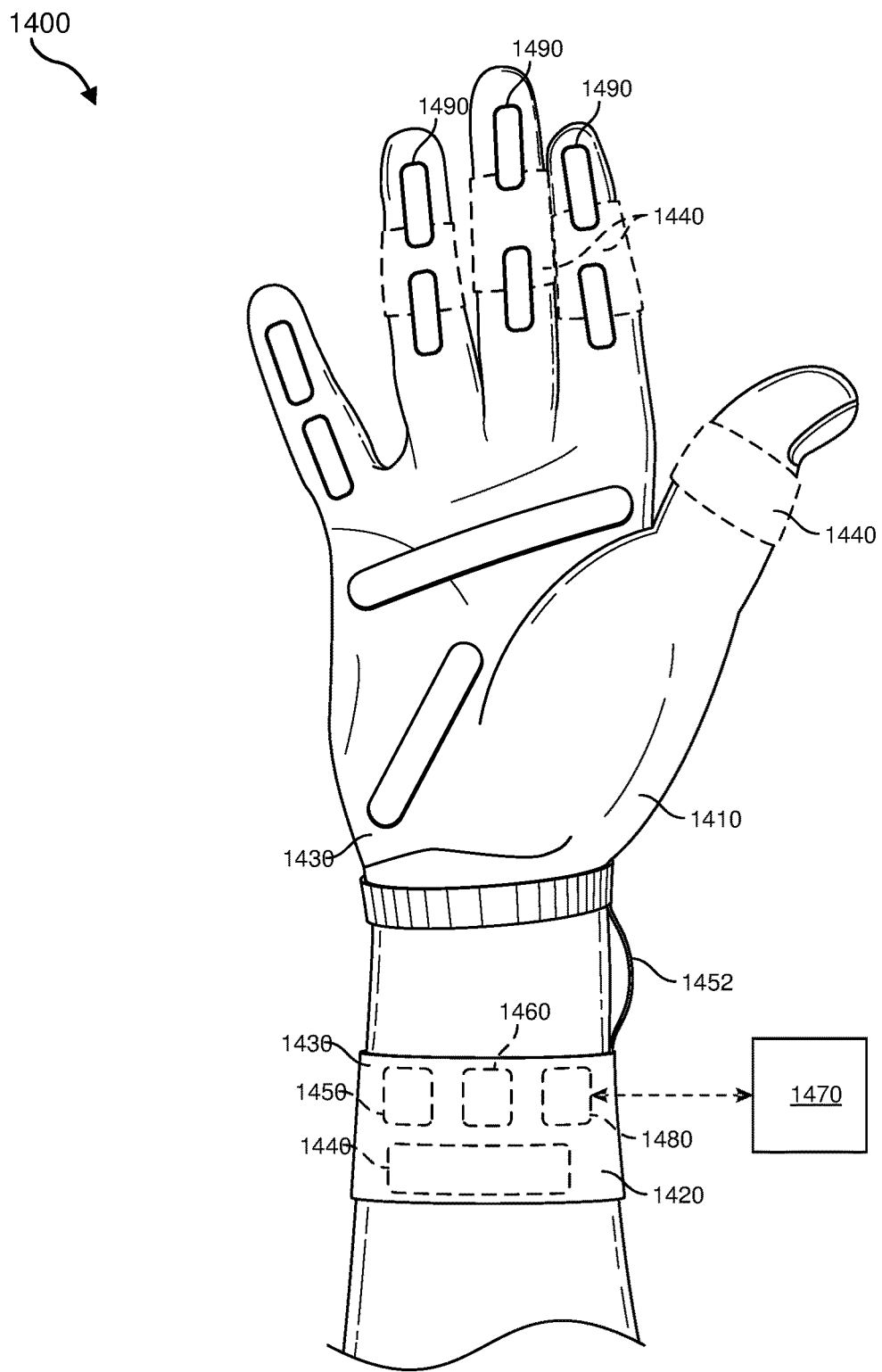
FIG. 14 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 14 illustrates a vibrotactile system 1400 in the form of a wearable glove (haptic device 1410) and wristband (haptic device 1420). Haptic device 1410 and haptic device 1420 are shown as examples of wearable devices that include a flexible, wearable textile material 1430 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1440 may be positioned at least partially within one or more corresponding pockets formed in textile material 1430 of vibrotactile system 1400. Vibrotactile devices 1440 may be positioned in locations to provide a vibrating sensation (e.g., haptic feedback) to a user of vibrotactile system 1400. For example, vibrotactile devices 1440 may be positioned against the user's finger(s), thumb, or wrist, as shown in FIG. 14. Vibrotactile devices 1440 may, in some examples, be sufficiently flexible to conform to or bend with the user's corresponding body part(s).

A power source 1450 (e.g., a battery) for applying a voltage to the vibrotactile devices 1440 for activation thereof may be electrically coupled to vibrotactile devices 1440, such as via conductive wiring 1452. In some examples, each of vibrotactile devices 1440 may be independently electrically coupled to power source 1450 for individual activation. In some embodiments, a processor 1460 may be operatively coupled to power source 1450 and configured (e.g., programmed) to control activation of vibrotactile devices 1440.

Vibrotactile system 1400 may be implemented in a variety of ways. In some examples, vibrotactile system 1400 may be a standalone system with integral subsystems and components for operation independent of other devices and systems. As another example, vibrotactile system 1400 may be configured for interaction with another device or system 1470. For example, vibrotactile system 1400 may, in some examples, include a communications interface 1480 for receiving and/or sending signals to the other device or system 1470. The other device or system 1470 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1480 may enable communications between vibrotactile system 1400 and the other device or system 1470 via a wireless (e.g., Wi-Fi, BLUETOOTH, cellular, radio, etc.) link or a wired link. If present, communications interface 1480 may be in communication with processor 1460, such as to provide a signal to processor 1460 to activate or deactivate one or more of the vibrotactile devices 1440.

Vibrotactile system 1400 may optionally include other subsystems and components, such as touch-sensitive pads 1490, pressure sensors, motion sensors, position sensors, lighting elements, and/or user interface elements (e.g., an on/off button, a vibration control element, etc.). During use, vibrotactile devices 1440 may be configured to be activated for a variety of different reasons, such as in response to the user's interaction with user interface elements, a signal from the motion or position sensors, a signal from the touch-sensitive pads 1490, a signal from the pressure sensors, a signal from the other device or system 1470, etc.

Although power source 1450, processor 1460, and communications interface 1480 are illustrated in FIG. 14 as being positioned in haptic device 1420, the present disclosure is not so limited. For example, one or more of power source 1450, processor 1460, or communications interface 1480 may be positioned within haptic device 1410 or within another wearable textile.

Figure 15:
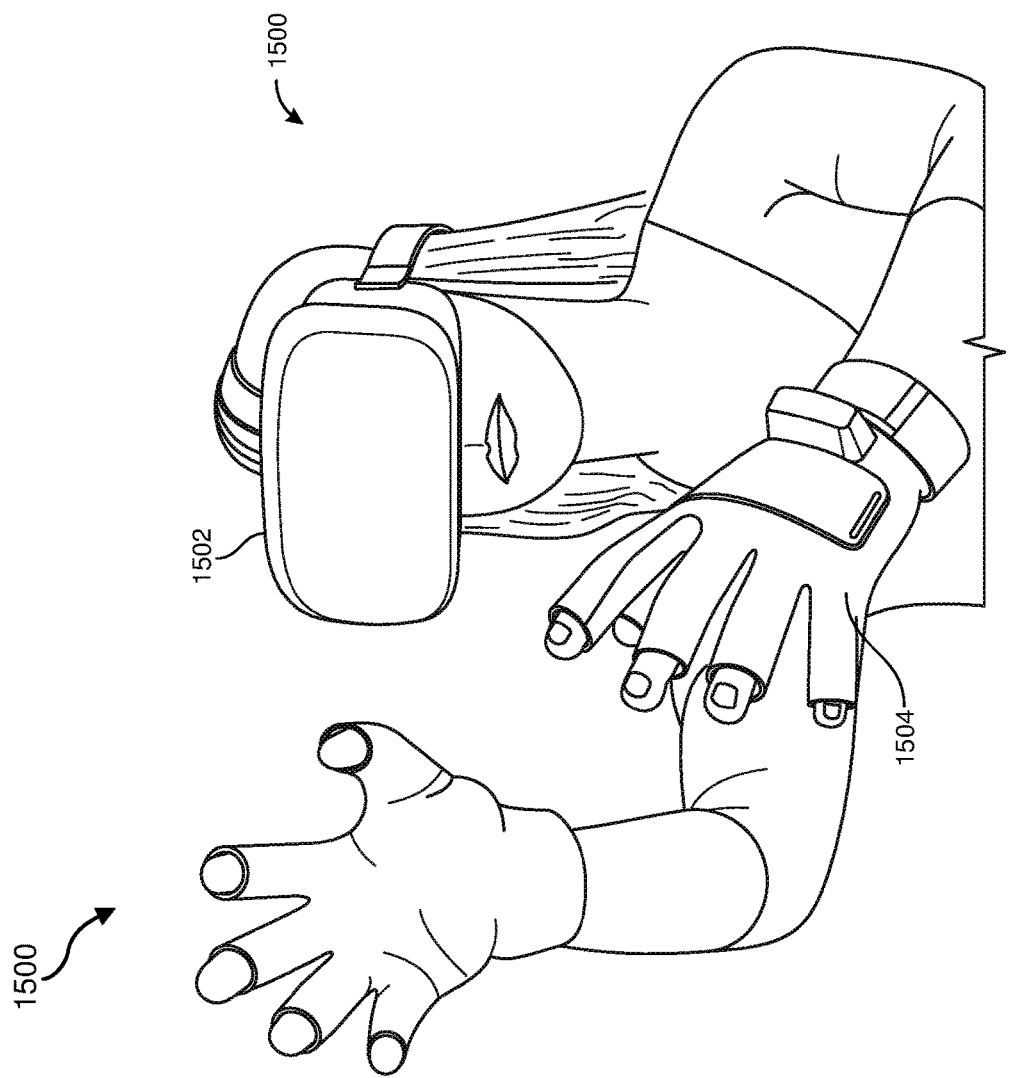
FIG. 15 is an illustration of an exemplary virtual-reality environment according to embodiments of this disclosure.

Haptic wearables, such as those shown in and described in connection with FIG. 14, may be implemented in a variety of types of artificial-reality systems and environments. FIG. 15 shows an example artificial-reality environment 1500 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1502 generally represents any type or form of virtual-reality system, such as virtual-reality system 1300 in FIG. 13. Haptic device 1504 generally represents any type or form of wearable device, worn by a user of an artificial-reality system, that provides haptic feedback to the user to give the user the perception that he or she is physically engaging with a virtual object. In some embodiments, haptic device 1504 may provide haptic feedback by applying vibration, motion, and/or force to the user. For example, haptic device 1504 may limit or augment a user's movement. To give a specific example, haptic device 1504 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1504 to send action requests to a console. Examples of action requests include, without limitation, requests to start an application and/or end the application and/or requests to perform a particular action within the application.

Figure 16:
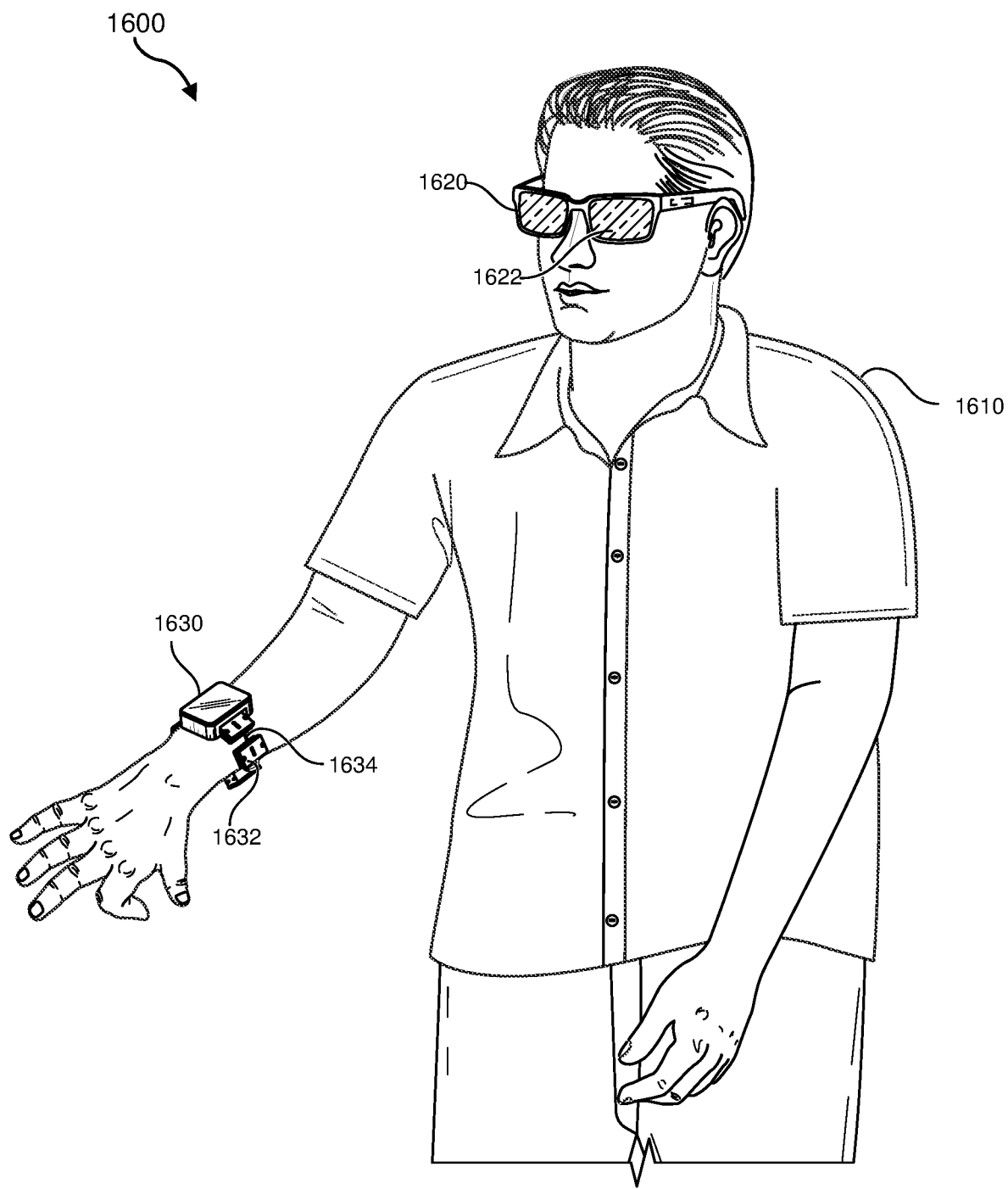
FIG. 16 is an illustration of an exemplary augmented-reality environment according to embodiments of this disclosure.

While haptic interfaces may be used with virtual-reality systems, as shown in FIG. 15, haptic interfaces may also be used with augmented-reality systems, as shown in FIG. 16. FIG. 16 is a perspective view of a user 1610 interacting with an augmented-reality system 1600. In this example, user 1610 may wear a pair of augmented-reality glasses 1620 that may have one or more displays 1622 and that are paired with a haptic device 1630. In this example, haptic device 1630 may be a wristband that includes a plurality of band elements 1632 and a tensioning mechanism 1634 that connects band elements 1632 to one another.

One or more of band elements 1632 may include any type or form of actuator suitable for providing haptic feedback. For example, one or more of band elements 1632 may be configured to provide one or more of various types of cutaneous feedback, including vibration, force, traction, texture, and/or temperature. To provide such feedback, band elements 1632 may include one or more of various types of actuators. In one example, each of band elements 1632 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1410, 1420, 1504, and 1630 may include any suitable number and/or type of haptic transducer, sensor, and/or feedback mechanism. For example, haptic devices 1410, 1420, 1504, and 1630 may include one or more mechanical transducers, piezoelectric transducers, and/or fluidic transducers. Haptic devices 1410, 1420, 1504, and 1630 may also include various combinations of different types and forms of transducers that work together or independently to enhance a user's artificial-reality experience. In one example, each of band elements 1632 of haptic device 1630 may include a vibrotactor (e.g., a vibrotactile actuator) configured to vibrate in unison or independently to provide one or more of various types of haptic sensations to a user.

Figure 17A:
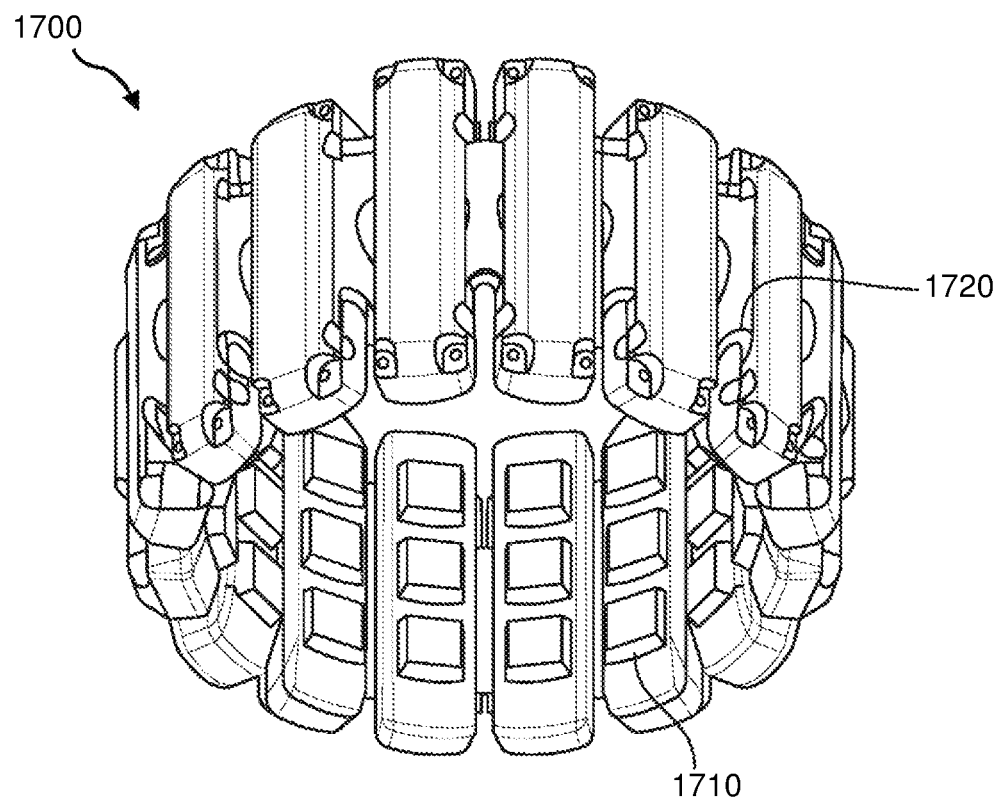
FIGS. 17A and 17B are illustrations of an exemplary human-machine interface configured to be worn around a user's lower arm or wrist.
Figure 17B:
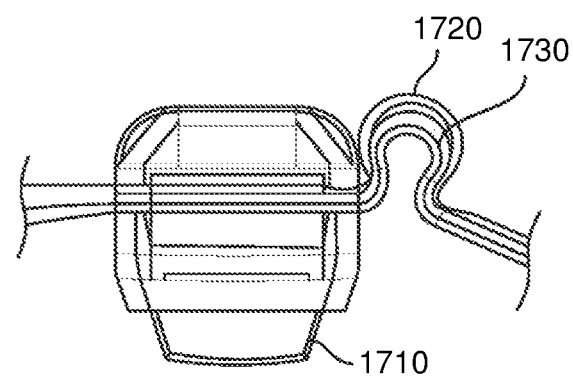

FIG. 17A illustrates an exemplary human-machine interface (also referred to herein as an EMG control interface) configured to be worn around a user's lower arm or wrist as a wearable system 1700. In this example, wearable system 1700 may include sixteen neuromuscular sensors 1710 (e.g., EMG sensors) arranged circumferentially around an elastic band 1720 with an interior surface 930 configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 17B illustrates a cross-sectional view through one of the sensors of the wearable device shown in FIG. 17A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1710 is discussed in more detail below with reference to FIGS. 18A and 18B.

Figure 18A:
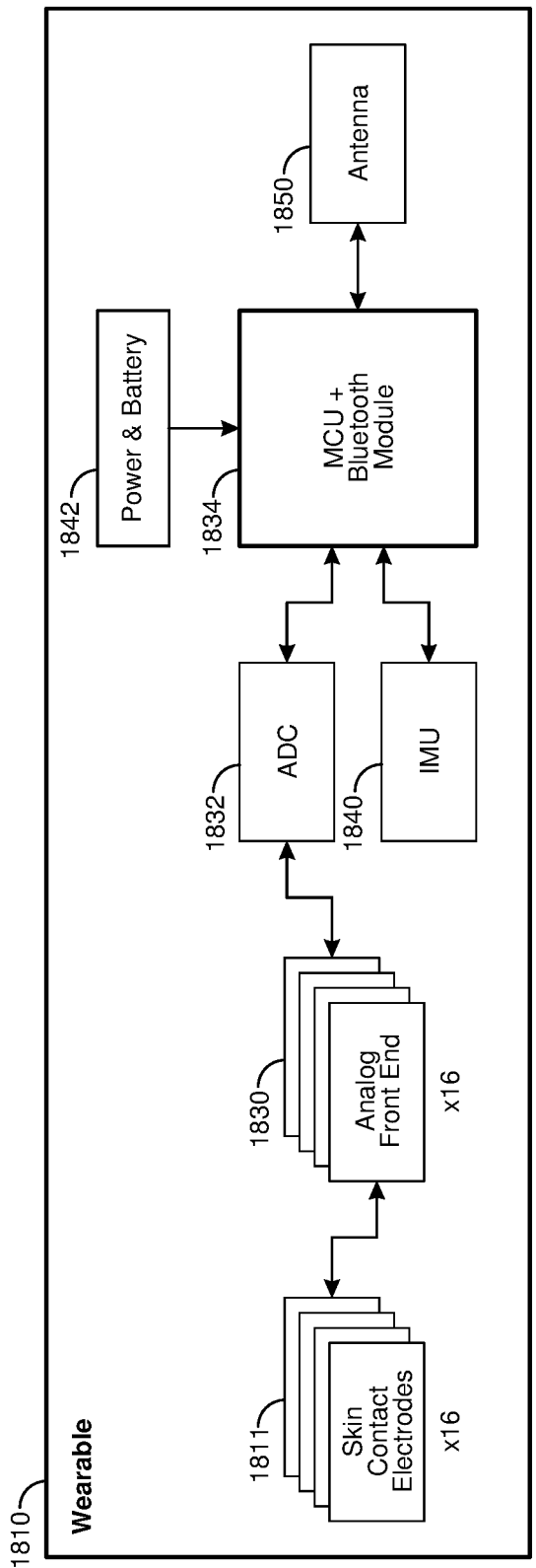
FIGS. 18A and 18B are illustrations of an exemplary schematic diagram with internal components of a wearable system.
Figure 18B:
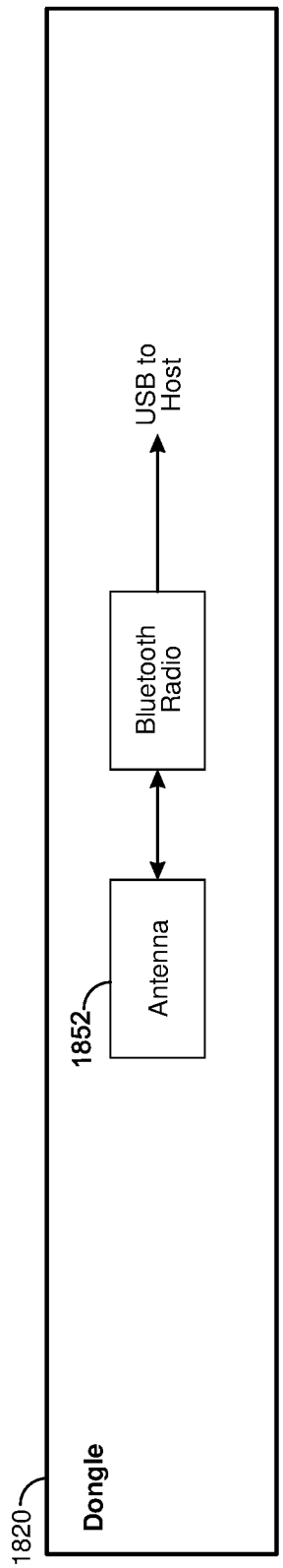

FIGS. 18A and 18B illustrate an exemplary schematic diagram with internal components of a wearable system with EMG sensors. As shown, the wearable system may include a wearable portion 1810 (FIG. 18A) and a dongle portion 1820 (FIG. 18B) in communication with the wearable portion 1810 (e.g., via BLUETOOTH or another suitable wireless communication technology). As shown in FIG. 18A, the wearable portion 1810 may include skin contact electrodes 1811, examples of which are described in connection with FIGS. 17A and 17B. The output of the skin contact electrodes 1811 may be provided to analog front end 1830, which may be configured to perform analog processing (e.g., amplification, noise reduction, filtering, etc.) on the recorded signals. The processed analog signals may then be provided to analog-to-digital converter 1832, which may convert the analog signals to digital signals that can be processed by one or more computer processors. An example of a computer processor that may be used in accordance with some embodiments is microcontroller (MCU) 1834, illustrated in FIG. 18A. As shown, MCU 1834 may also include inputs from other sensors (e.g., IMU sensor 1840), and power and battery module 1842. The output of the processing performed by MCU 1834 may be provided to antenna 1850 for transmission to dongle portion 1820 shown in FIG. 18B.

Dongle portion 1820 may include antenna 1852, which may be configured to communicate with antenna 1850 included as part of wearable portion 1810. Communication between antennas 1850 and 1852 may occur using any suitable wireless technology and protocol, non-limiting examples of which include radiofrequency signaling and BLUETOOTH. As shown, the signals received by antenna 1852 of dongle portion 1820 may be provided to a host computer for further processing, display, and/or for effecting control of a particular physical or virtual object or objects.

Although the examples provided with reference to FIGS. 17A-17B and FIGS. 18A-18B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

In some embodiments, one or more objects (e.g., data associated with sensors, and/or activity information) of a computing system may be associated with one or more privacy settings. These objects may be stored on or otherwise associated with any suitable computing system or application, such as, for example, a social-networking system, a client system, a third-party system, a messaging application, a photo-sharing application, a biometric data acquisition application, an artificial-reality application, and/or any other suitable computing system or application.

Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within an application (such as an artificial-reality application). When privacy settings for an object allow a particular user or other entity to access that object, the object may be described as being "visible" with respect to that user or other entity. As an example, a user of an artificial-reality application may specify privacy settings for a user-profile page that identify a set of users that may access the artificial-reality application information on the user-profile page, thus excluding other users from accessing that information. As another example, an artificial-reality application may store privacy policies/guidelines. The privacy policies/guidelines may specify what information of users may be accessible by which entities and/or by which processes (e.g., internal research, advertising algorithms, machine-learning algorithms), thus ensuring only certain information of the user may be accessed by certain entities or processes.

In some embodiments, privacy settings for an object may specify a "blocked list" of users or other entities that should not be allowed to access certain information associated with the object. In some cases, the blocked list may include third-party entities. The blocked list may specify one or more users or entities for which an object is not visible.

Privacy settings associated with an object may specify any suitable granularity of permitted access or denial of access. As an example, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. In some embodiments, different objects of the same type associated with a user may have different privacy settings. In addition, one or more default privacy settings may be set for each object of a particular object-type.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system comprising:
a wristband dimensioned to be donned on a wrist of a user of a computing device;
a set of sensors coupled to the wristband, wherein the set of sensors:
   detect one or more neuromuscular signals via the wrist of the user; and
   measure an amount of force exerted by one or more body parts of the user; and
at least one processing device communicatively coupled to the set of sensors, wherein the processing device:
   determines, based at least in part on the neuromuscular signals detected by the set of sensors, an intention of the user in connection with an application running on the computing device;
   identifies a mapping between a set of intentions and a set of modifications capable of being performed on the application running on the computing device;
   determines, based at least in part on the amount of force measured by the set of sensors, an intensity level corresponding to the intention of the user;
   determines a modification to be performed on a feature of the application running on the computing device based at least in part on the mapping, the intention of the user, and/or the intensity level corresponding to the intention of the user; and
   performs the modification on the feature of the application running on the computing device to account for the intention of the user and the intensity level corresponding to the intention of the user.

2. The system of claim 1, wherein:
the processing device is communicatively coupled to the computing device; and
to modify the feature of the application, the processing device sends at least one message indicative of the intention of the user to the computing device.

3. The system of claim 2, wherein:
the application running on the computing device comprises a communication application; and
the message sent by the processing device causes the communication application to modify an attribute of text entered into the communication application by the user.

4. The system of claim 3, wherein the attribute of the text comprises at least one of:
an emboldening feature of the text;
an italicizing feature of the text;
an underlining feature of the text;
a font size of the text; or
a font of the text.

5. The system of claim 2, wherein:
the application running on the computing device comprises a communication application; and
the message sent by the processing device causes the communication application to add an emoji or an animated sticker to an outgoing communication created by the user in the communication application.

6. The system of claim 2, wherein:
the application running on the computing device comprises a gaming application; and
the message sent by the processing device causes the gaming application to modify an audio feature or a visual feature provided by the computing device to the user.

7. The system of claim 1, wherein:
to determine the intention of the user, the processing device identifies an emotional state of the user as the user operates the application running on the computing device; and
to modify the feature of the application, the processing device notifies the application of the emotional state of the user to enable the application to modify the feature based at least in part on the emotional state of the user.

8. The system of claim 7, wherein the emotional state of the user comprises at least one of:
an angry state;
a stressed state;
a fearful state;
a calm state; and
a happy state.

9. The system of claim 1, further comprising at least one motion sensor coupled to the wristband, wherein:
the motion sensor measures one or more motions exhibited by the user while operating the application running on the computing device; and
the processing device:
   is communicatively coupled to the motion sensor; and
   determines the intention of the user based at least in part on the neuromuscular signals detected by the set of sensors and the motions measured by the motion sensor.

10. The system of claim 9, wherein the motion sensor comprises at least one of:
an accelerometer;
a gyroscope;
a magnetometer; or
an inertial measurement unit.

11. The system of claim 1, wherein the computing device comprises at least one of:
a mobile phone;
a computer;
an artificial reality system;
a gaming platform; or
a smart watch.

12. The system of claim 1, wherein the computing device:
provides, for presentation to the user, a prompt that enables the user to confirm or deny the intention of the user as determined by the processing device;
receives, from the user, input confirming the intention of the user as determined by the processing device; and
upon receiving the input from the user, modifying the feature of the application running on the computing device to account for the intention of the user.

13. A wristband comprising:
a set of sensors that:
   detect one or more neuromuscular signals via a wrist of a user; and
   measure an amount of force exerted by one or more body parts of the user;
at least one processing device communicatively coupled to the set of sensors, wherein the processing device:
   determines, based at least in part on the neuromuscular signals detected by the set of sensors, an intention of the user in connection with a computing application;

identifies a mapping between a set of intentions and a set of modifications capable of being performed on the computing application;

determines, based at least in part on the amount of force measured by the set of sensors, an intensity level corresponding to the intention of the user;

determines a modification to be performed on a feature of the computing application based at least in part on the mapping, the intention of the user, and/or the intensity level corresponding to the intention of the user; and performs the modification on the intention of the computing application to account for the intention of the user and the intensity level corresponding to the intention of the user.

14. The wristband of claim 13, wherein:

the processing device is communicatively coupled to a computing device on which the computing application is running; and to modify the feature of the computing application, the processing device sends at least one message indicative of the intention of the user to the computing device.

15. The wristband of claim 14, wherein:

the computing application running on the computing device comprises a communication application; and the message sent by the processing device causes the communication application to modify an attribute of text entered into the communication application by the user.

16. The wristband of claim 15, wherein the attribute of the text comprises at least one of:

an emboldening feature of the text;
an italicizing feature of the text;
an underlining feature of the text;
a font size of the text; or
a font of the text.

17. The wristband of claim 14, wherein:

the computing application running on the computing device comprises a communication application; and the message sent by the processing device causes the communication application to add an emoji or an animated sticker to an outgoing communication created by the user in the communication application.

18. The wristband of claim 14, wherein:

The computing application running on the computing device comprises a gaming application; and the message sent by the processing device causes the gaming application to modify an audio feature or a visual feature provided by the computing device to the user.

19. A method comprising:

detecting, by a set of sensors incorporated into a wearable donned by a user of a computing device, one or more neuromuscular signals via a wrist of the user;

measuring, by the set of sensors, an amount of force exerted by one or more body parts of the user;

determining, by at least one processing device communicatively coupled to the set of sensors, an intention of the user in connection with an application running on the computing device based at least in part on the neuromuscular signals detected via the wrist of the user;

identifying a mapping between a set of intentions and a set of modifications capable of being performed on the application running on the computing device;

determining, based at least in part on the amount of force measured by the set of sensors, an intensity level corresponding to the intention of the user;

determining a modification to be performed on a feature of the application running on the computing device based at least in part on the mapping, the intention of the user, and/or the intensity level corresponding to the intention of the user; and performing, by the processing device, the modification on the feature of the application running on the computing device to account for the intention of the user and the intensity level corresponding to the intention of the user.

* * * * *